United States Patent
Larsson et al.

(10) Patent No.: US 8,649,370 B2
(45) Date of Patent: Feb. 11, 2014

(54) SYSTEMS AND METHODS FOR PROGRAMMING CONNECTIONS THROUGH A MULTI-STAGE SWITCH FABRIC WITH BLOCKING RECOVERY, BACKGROUND REBALANCING, AND ROLLBACK

(75) Inventors: Gustav Karl Larsson, Sunnyvale, CA (US); Satish Mysore Gopalakrishna, Alpharetta, GA (US); Goran Bjelcevic, Roswell, GA (US); Neena Aluri, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 1365 days.

(21) Appl. No.: 11/749,829

(22) Filed: May 17, 2007

(65) Prior Publication Data

US 2008/0285449 A1 Nov. 20, 2008

(51) Int. Cl.
 *G01R 31/06* (2006.01)
 *H04L 12/50* (2006.01)

(52) U.S. Cl.
 USPC ........... 370/360; 370/232; 370/235; 370/237; 370/238

(58) Field of Classification Search
 None
 See application file for complete search history.

(56) References Cited

U.S. PATENT DOCUMENTS

| | | | | |
|---|---|---|---|---|
| 3,643,032 A * | 2/1972 | Ulrich et al. | | 379/269 |
| 7,106,729 B1 | 9/2006 | Gullicksen et al. | | 370/388 |
| 7,239,608 B2 * | 7/2007 | Sreejith et al. | | 370/230 |
| 7,480,246 B2 * | 1/2009 | Agarwal et al. | | 370/235 |
| 2002/0146003 A1 * | 10/2002 | Kam et al. | | 370/388 |
| 2003/0033345 A1 * | 2/2003 | Keefer et al. | | 709/102 |
| 2003/0214944 A1 * | 11/2003 | Towles | | 370/388 |
| 2005/0262148 A1 * | 11/2005 | Davitt | | 707/104.1 |
| 2006/0165085 A1 * | 7/2006 | Konda | | 370/395.1 |
| 2006/0165112 A1 * | 7/2006 | Varma | | 370/428 |
| 2007/0140114 A1 * | 6/2007 | Mosko | | 370/229 |

* cited by examiner

*Primary Examiner* — Faruk Hamza
*Assistant Examiner* — Thinh Tran
(74) *Attorney, Agent, or Firm* — Clements Bernard PLLC; Christopher L. Bernard; Lawrence A. Baratta, Jr.

(57) ABSTRACT

The present invention provides systems and methods for programming connections through a multi-stage switch fabric. The present invention utilizes load-balancing, blocking recovery, background rebalancing, and rollback algorithms to select and manage connection balance on center stage switches in the multi-stage switch fabric for new and modified connections. The load-balancing algorithm attempts to spread the multi-connection slices across center stage switches as evenly as possible, to increase the probability that future multi-connection slices can be added without needing to rearrange existing slices. Advantageously, the present invention is efficient by making the best possible local decision for one multi-connection slice at a time, without considering other multi-connection slices that may also need center switch assignments. Additionally blocking recovery, rollback and background rebalancing features are also supported.

17 Claims, 20 Drawing Sheets

SYSTEMS AND METHODS FOR PROGRAMMING CONNECTIONS THROUGH A MULTI-STAGE SWITCH FABRIC WITH BLOCKING RECOVERY, BACKGROUND REBALANCING, AND ROLLBACK

FIELD OF THE INVENTION

The present invention relates generally to switching, such as in optical and data networks. More specifically, the present invention relates to systems and methods for programming connections through a multi-stage switch fabric. The present invention utilizes load-balancing, blocking recovery, background rebalancing, and rollback algorithms to select center stage switches in the multi-stage switch fabric for new and modified connections.

BACKGROUND OF THE INVENTION

Communication networks, such as optical and data networks, utilize switch elements, such as a three-stage Clos switch, to direct connections between other switch elements located at other nodes. Network connections are coupled to each of the switch element inputs and outputs, so that data carried on any input line of a switch element can be switched to any output line on the same switch element. The switch elements include means to program the input to output connections. Networks are constantly changing in terms of connections, such as by adding/dropping connections, rerouting connections responsive to fault conditions, and the like. Invariably, the switch element is required to shift connections from one output line to another as the network changes, and the switch element in a network must be appropriately reconfigured or rearranged.

Switching events require the network connections across the switch element to be manipulated. Due to the number of connections across a single switching element, compensating for a switching event can be a complex and computationally intensive procedure. Examples of switching events include instances when network connections are added to a switch element already in use or instances when one of the links between network elements fails and another route through the network element is needed. When switching events require new connections to be formed, conventional switch elements must reconfigure the entire switch element. Many switch elements include devices, which are grouped into one of three stages of a three stage Clos array (e.g., within an ingress stage, a center stage or an egress stage). Typically, in response to switching events all of the switching devices (including those related to connections that are not directly affected by the switching event) within each of the stages of the array need to be reconfigured to form new connections through the switch element.

Referring to FIG. 1, a logical model 10 of an exemplary three-stage switch is illustrated. The logical model 10 includes input sorters 12$a$,12$b$ with lines statically mapped to one or more input routers 14$a$,14$b$,14$c$,14$d$. The one or more input routers 14$a$,14$b$,14$c$,14$d$ each include lines to each of one or more center switches 16$a$,16$b$ which in turn include lines to each of one or more output routers 18$a$,18$b$,18$c$,18$d$. The output routers 18$a$,18$b$,18$c$,18$d$ include lines statically mapped to output sorters 20$a$,20$b$. In an exemplary embodiment, the logical model includes 32 input sorters 12, 512 input routers 14, 24 center switches 16, 512 output routers 18, and 32 output sorters 20.

Conventionally, the algorithm for switch programming is a router-based algorithm. The router size is identical to the number of center stage switches and it must either be a factor of the line size or contain the line. For example, in the logical model 10 includes 24 center switches 16 because 24 is a factor of a line size 48 and 192, and 24 contains line sizes 3 and 13. Note, line sizes 3, 12, 48, and 192 correspond to SONET OC-3, OC-12, OC-48, and OC-192 and SDH STM-1, STM-4, STM-16, and STM-64. The sorters 12,20 allow timeslots in the line to be arbitrarily remapped. Since each line is mapped to one or more routers 14,18, the timeslots in the sorters 12,20 can be mapped to be input to the routers 14,18 is some specific order for the need of the switch control algorithm. An example of a router-based algorithm is illustrated in commonly-assigned U.S. Pat. No. 7,106,729 issued Sep. 12, 2006, and entitled "SWITCHING CONTROL MECHANISM BASED UPON THE LOGICAL PARTITIONING OF A SWITCH ELEMENT," the contents of which are incorporated in-full by reference herein.

The parameters associated with the logical model are:

| Variable | Description |
| --- | --- |
| $N_c$ | Number of logical center stage switches used |
| $N_i$ | Number of ingress routers |
| $N_e$ | Number of egress routers |
| $N_s$ | Number of sorters |
| $N_f$ | Number of routers per sorter |
| $N_{r,max}$ | Maximum number of routers per sorter |
| $S_c$ | Size of a logical center switch |
| $S_i$ | Size of an ingress router |
| $S_e$ | Size of an egress router |
| $S_{fabric, log}$ | Usable switching capacity of the logical fabric |
| $T_{max, log}$ | Maximum number of inputs and outputs |

In an exemplary embodiment of the logical model 10, $N_c$=24, $N_i$=Ne=512, $N_s$=32, $N_r$=16, $N_{r,max}$=18, $S_c$=Ni=$N_e$=512, and $S_i$=$S_e$=$N_c$=24. The usable switch capacity, $S_{fabric, log}$, equals $S_i \cdot S_c$=$S_e \cdot S_c$=12288. The maximum number of inputs and outputs, $T_{max, log}$, equals $N_s \cdot N_f \cdot S_i$=$N_s \cdot N_f \cdot S_e$=12288.

The logical model 10 corresponds to a physical model of a switch. The sorters 12,20 correspond to line modules (LM) which include ports for inputs and outputs of lines. The center switches 16 correspond to physical center stage switches. For example, the LMs can connect to each of one or more center stage switches through a backplane. In an exemplary embodiment, the maximum number of physical inputs and outputs, $T_{max, phy}$, equals 12288, i.e. the same as $T_{max, log}$. Additionally, a physical center stage switch can support a switching fabric, $S_{fabric, phy}$, of 17280 which is less than $S_{fabric,log}$. The number of timeslots per physical link, $T_s$, can be equal to 18 which is less than $N_r$. The maximum number of inputs and outputs of the logical model (12288) matches exactly with the maximum number of timeslots to be supported in the physical switch (12288). The center stage switch capacity (12288) matches with the maximum number of inputs and outputs (12288) and only needs to use a fraction of available physical switch capacity (17280). The number of inputs and outputs per sorter (384) matches with the maximum number of timeslots in a LM (384) card. The number of routers per sorter (16) is less than the number of timeslots per link (18). And the size of the router (24) is less than the number of links between center stage switching chips and ingress/egress switching chips (30 and 32).

As such, this logical model 10 can fully represent the physical switch. The logical model 10 fulfills the requirements of switching timeslots (or wavelengths) through the center switch in a rearrangeably, non-blocking fashion. This model 10 provides the framework to pre-establish all connections while maintaining certain properties so that a protection switch for different upper layer applications can be done without a connection rearrangement calculation.

The center stage switching chips and ingress/egress switching chips have two fabric configuration banks, an active and a standby back. Configuration commands can be written to either bank at any time. Active bank updates are generally not hitless because the ingress, center, and egress switching chips cannot be written simultaneously. The traffic hit, if any, happens only on the connection being updated, and not on other connections. A hitless update is achieved by writing the new configuration to the standby bank and then doing a global active/standby bank swap, hereinafter referred to as a chain pull. All switching chips change banks on the next switch frame boundary after a chain pull. It is not possible to change the bank on just one switching chip; the chain pull is a global operation. Performing a chain pull involves hardware and software operations on ingress, egress, and center stage switches on switch module (SM) and LM modules. To protect against backplane glitches triggering a chain pull, each LM must arm its chain pull circuit before the SM strobes a global chain pull line. Hence the chain pull is operation is costly operation in terms of time it consumes to perform the operation. This has a direct effect on the mesh restoration times of different sub network connections.

Referring to FIG. 2, an exemplary switch control algorithm to program the switch fabric is Paull's algorithm. It provides a method of arranging a full set of input-to-output connections for a logical switch fabric. FIG. 2 illustrates Paull's matrix 30 representation for a three-stage switch. The ingress switches (or routers) index the rows of Paull's matrix 30. The egress switches (or routers) index the columns of Paull's matrix 30. The elements, symbols, in Paull's matrix 30 represent center switches. For a three-stage switch, such as the one in FIG. 1, consider any switch A in the input stage and any switch B in the output stage. An input to switch A can be connected to an output of B via any center stage switch, say F. Paull's connection matrix 30 represents this connection by entering the middle switch F into the (A, B) entry of the r×r matrix 30, where r is the number of input/output switches. In Paull's matrix multiple symbols may reside in any (A, B) entry. This corresponds to having multiple connections between the ingress switch A and the egress switch B.

For a valid connection matrix, each row can have at most m symbols (m represents the size of the ingress/egress switches), since there can be at most as many paths through an ingress switch as there are inputs to that switch. Each column can have at most m symbols, since there can be at most as many paths through an egress switch as there are outputs of that switch. The symbols in each row must be distinct, since there is only one edge from the egress stage switch to any center stage switch, and multi-casting to a different egress stage switches from a center stage switch is not allowed. The symbols in each column must be distinct, since there is only one edge between a center stage switch and an egress stage switch, and an edge cannot carry signals from two different inputs. In terms of performance of Paull's algorithm, the time spent on adding a single connection is non-deterministic because the nature of the algorithm requires searching for symbols in Paull's matrix in a manner of extending chains. The length of the chain is non-deterministic.

Disadvantageously, for every connection setup chain pull operation is required which is costly operation in terms of time it consumes to perform the operation. This has a direct effect on the mesh restoration times of different sub network connections. Also for every connection setup, Paull's rearrangement algorithm is run which is time consuming depending on how many connections get rearranged. In terms of performance of Paull's algorithm, the time spent on adding a single connection is non-deterministic because the nature of the algorithm requires searching for symbols in Paull's matrix in a manner of extending chains and the length of the chain is non-deterministic. Conventional router-based algorithms do not allow a switch to setup drop and continue and multicast connections easily. It is very cumbersome to setup those connections and also to change (modify) them when needed. Arbitrary timeslots must be reserved for setting up any arbitrary connections which involves multicast and drop-and-continue kind of connections. Also setup and maintenance of unidirectional connections is complex. Single timeslots could not be shared between more than one connections which are setup at two different times. This makes it extremely difficult to setup and manage test access point (TAP) connections and connection loopbacks especially on those connections which had some kind of protection scheme. Finally, line based switching scheme and path based switching schemes cannot co-exist at the same time for any timeslot.

BRIEF SUMMARY OF THE INVENTION

In various exemplary embodiments, the present invention provides systems and methods for programming connections through a multi-stage switch fabric. The present invention utilizes load-balancing, blocking recovery, background rebalancing, and rollback algorithms to select and manage connection balance on center stage switches in the multi-stage switch fabric for new and modified connections. The load-balancing algorithm attempts to spread the multi-connection slices across center stage switches as evenly as possible, to increase the probability that future multi-connection slices can be added without needing to rearrange existing slices. Advantageously, the present invention is efficient by making the best possible local decision for one multi-connection slice at a time, without considering other multi-connection slices that may also need center switch assignments. Additionally blocking recovery, rollback and background rebalancing features are also supported.

The present invention selects a center stage switch just once for each multi-connection slice, when the multi-connection slice is configured (Add Cross Connect). When all multi-connections, each having multiple multi-connection slices are completely configured, blocking recovery and background rebalancing are used in conjunction with the load-balancing algorithm to possibly move multi-connection slices at a later time to more evenly distribute slices across the center stage switches or to recover from blocking which prevents new slices from being added.

Advantageously, the present invention removes the need to perform chain pull operations for each connection setup, reduces mesh restoration times through the switch fabric, and reduces switch fabric rearrangements. Additionally, the load-balancing algorithm allows easy setup of drop and continue and multicast connections. Setup and maintenance of unidirectional connections is straightforward and natively supported. Setup of TAP connections and connection loopbacks are manageable with the present invention. The representation of virtual connection termination points and cascaded selectors is improved with the present invention. In terms of performance of adding a single new connection, the time spent is deterministic because the nature of the present invention. Finally, Line switching protection schemes, such as bi-directional line switched ring (BLSR), and path protection scheme, such as uni-directional line switched ring (UPSR) can exist at the simultaneous for each timeslot.

In an exemplary embodiment of the present invention, a method for programming a multi-connection slice through a multi-stage switch fabric including a plurality of ingress switches interconnected to a plurality of center stage switches interconnected to a plurality of egress switches includes receiving a multi-connection slice request, wherein the multi-connection slice include the flow in a single direction across the multi-stage switch fabric from one of the plurality of ingress switches to one of the plurality of egress switches, and wherein the request is the number of channels; computing an imbalance for all links from the one of the plurality of ingress switches to each of the plurality of center stage switches and from the one of the plurality of egress switches to each of the plurality of center stage switches; and selecting a center stage switch of the plurality of center stage switches responsive to the lowest imbalance from the computing step. The method for programming a multi-connection slice through a multi-stage switch fabric further includes performing blocking recovery if the selecting step fails due to blocking on one or more links, wherein blocking recovery rearranges multi-connection slices on the one or more links so that the multi-connection slice request can be added. The blocking recovery includes randomly selecting one or more channels on the one or more links, finding multi-connection slices for each of the randomly selected one or more channels, and reallocating each of the multi-connection slices for each of the randomly selected one or more channels to a new center stage switch of the plurality of center stage switches. The blocking recovery is repeated if one or more links are still blocked. The method for programming a multi-connection slice through a multi-stage switch fabric further includes storing rollback data for each of multi-connection slices for each of the randomly selected one or more channels; performing a chain pull operation, wherein the chain pull operation includes a hitless update achieved by writing a new configuration to a standby bank of the plurality of ingress, egress, and center stage switches and then doing a global active/standby bank swap between an active and the standby bank of the plurality of ingress, egress, and center stage switches; and implementing a rollback utilizing the rollback data responsive to a failure of the chain pull operation. The rollback includes removing all of the multi-connection slices reallocated to the new center stage switch in the reallocating each of the multi-connection slices step, reallocating channels to a prior multi-connection slice, and reassigning time slots to the channels. The method for programming a multi-connection slice through a multi-stage switch fabric further includes performing background rebalancing responsive to the multi-stage switch fabric being idle for a time period, wherein background rebalancing is configured as a proactive measure to reduce imbalances in the plurality of center stage switches. The background rebalancing includes setting an imbalance threshold; finding all links between the plurality of ingress switches, the plurality of center stage switches, and the plurality of egress switches above the set imbalance threshold; randomly selecting multi-connection slices for each of the found links; and utilizing a chain pull operation to rearrange each of the randomly selected multi-connection slices to a new center stage switch of the plurality of center stage switches. The background rebalancing is repeated with one of a new imbalance threshold and the same imbalance threshold. The method for programming a multi-connection slice through a multi-stage switch fabric further includes storing rollback data for each of multi-connection slices, and implementing a rollback utilizing the rollback data responsive to a failure of the chain pull operation.

In another exemplary embodiment of the present invention, a multi-stage switch fabric with a load-balancing algorithm for provisioning multi-connection slices through center stages of the switch fabric includes a plurality of ingress switches interconnected to a plurality of center stage switches interconnected to a plurality of egress switches; a controller in communication with the plurality of ingress switches, the plurality of center stage switches, and the plurality of egress switches, wherein the controller is configured to receive a multi-connection slice request, wherein the multi-connection slice includes the flow in a single direction across the multi-stage switch fabric from one of the plurality of ingress switches to one of the plurality of egress switches, and select one of the center stage switch of the plurality of center stage switches responsive to computed imbalances of all links the one of the plurality of ingress switches to each of the plurality of center stage switches and from the one of the plurality of egress switches to each of the plurality of center stage switches. Optionally, the controller is further configured to perform blocking recovery responsive to blocking on one or more links, wherein blocking recovery rearranges multi-connection slices on the one or more links so that the multi-connection slice request can be added. Additionally, the controller is further configured to perform background rebalancing responsive to the multi-stage switch fabric being idle for a time period, wherein background rebalancing is configured as a proactive measure to reduce imbalances in the plurality of center stage switches. The multi-stage switch fabric with a load-balancing algorithm further includes a data store configured to store rollback data utilized to roll back the multi-connection slices on the one or more links if the blocking recovery or background rebalancing fails.

In yet another exemplary embodiment of the present invention, a three-stage optical switch with a load-balancing algorithm for provisioning connections through center stages of the switch fabric includes a plurality of line modules each line module including a plurality of ingress switches and a plurality of egress switches; a plurality of switch modules each switch module including a plurality of center stage switches; a backplane connected to the plurality of line modules and the plurality of switch modules, wherein the plurality of ingress switches, the plurality of egress switches, and the plurality of center stage switches are interconnected through the backplane; and means for selecting a center stage switch of the plurality of center stage switches responsive to one of a new and modified connection from one of the plurality of ingress switches to one of the plurality of egress switches. The three-stage optical switch with a load-balancing algorithm further includes means for blocking recovery, wherein blocking recovery rearranges connections between the of the plurality of ingress switches, the plurality of center stage switches, and the plurality of egress switches so that one of the new and modified connection can be added. The three-stage optical switch with a load-balancing algorithm further includes means for background rebalancing of the plurality of center stage switches, wherein background rebalancing is configured as a proactive measure to reduce imbalances in the plurality of center stage switches. The three-stage optical switch with a load-balancing algorithm further includes means for rollback responsive to a failure in blocking recovery. The three-stage optical switch with a load-balancing algorithm further includes means for rollback responsive to a failure in background rebalancing.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods for programming connections through a multi-stage switch fabric. The present invention utilizes load-balancing, blocking recovery, background rebalancing, and rollback algorithms to select and manage connection balance on center stage switches in the multi-stage switch fabric for new and modified connections. The load-balancing algorithm attempts to spread the multi-connection slices across center stage switches as evenly as possible, to increase the probability that future multi-connection slices can be added without needing to rearrange existing slices. Advantageously, the present invention is efficient by making the best possible local decision for one multi-connection slice at a time, without considering other multi-connection slices that may also need center switch assignments. Additionally blocking recovery, rollback and background rebalancing features are also supported.

The present invention selects a center stage switch just once for each multi-connection slice, when the multi-connection slice is configured (Add Cross Connect). When all multi-connections, each having multiple multi-connection slices are completely configured, blocking recovery and background rebalancing are used in conjunction with the load-balancing algorithm to possibly move multi-connection slices at a later time to more evenly distribute slices across the center stage switches or to recover from blocking which prevents new slices from being added.

Advantageously, the present invention removes the need to perform chain pull operations for each connection setup, reduces mesh restoration times through the switch fabric, and reduces switch fabric rearrangements. Additionally, the load-balancing algorithm allows easy setup of drop and continue and multicast connections. Setup and maintenance of unidirectional connections is straightforward and natively supported. Setup of TAP connections and connection loopbacks are manageable with the present invention. The representation of virtual connection termination points and cascaded selectors is improved with the present invention. In terms of performance of adding a single new connection, the time spent is deterministic because the nature of the present invention. Finally, Line switching protection schemes, such as bi-directional line switched ring (BLSR), and path protection scheme, such as uni-directional line switched ring (UPSR) can exist at the simultaneous for each timeslot.

Figure 1:
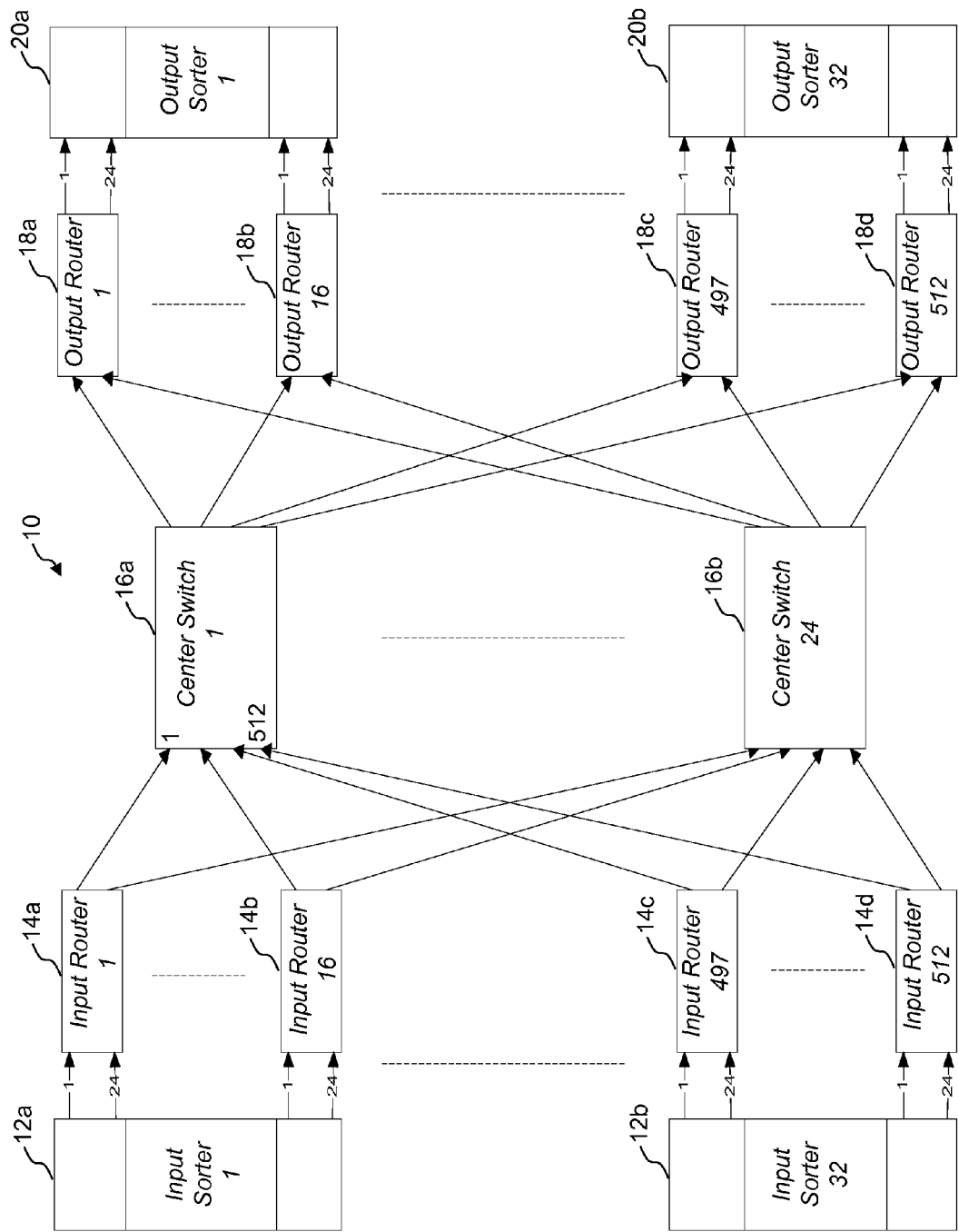
FIG. 1 is a logical model of an exemplary three-stage switch.
Figure 2:
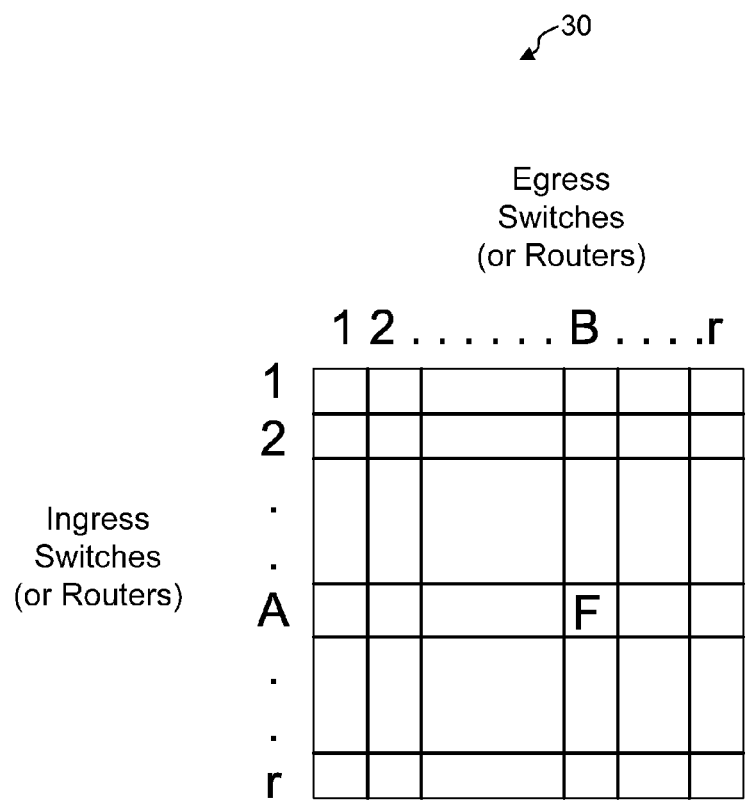
FIG. 2 is a matrix illustrating Paull's algorithm for programming the exemplary three-stage switch in FIG. 1.
Figure 3:
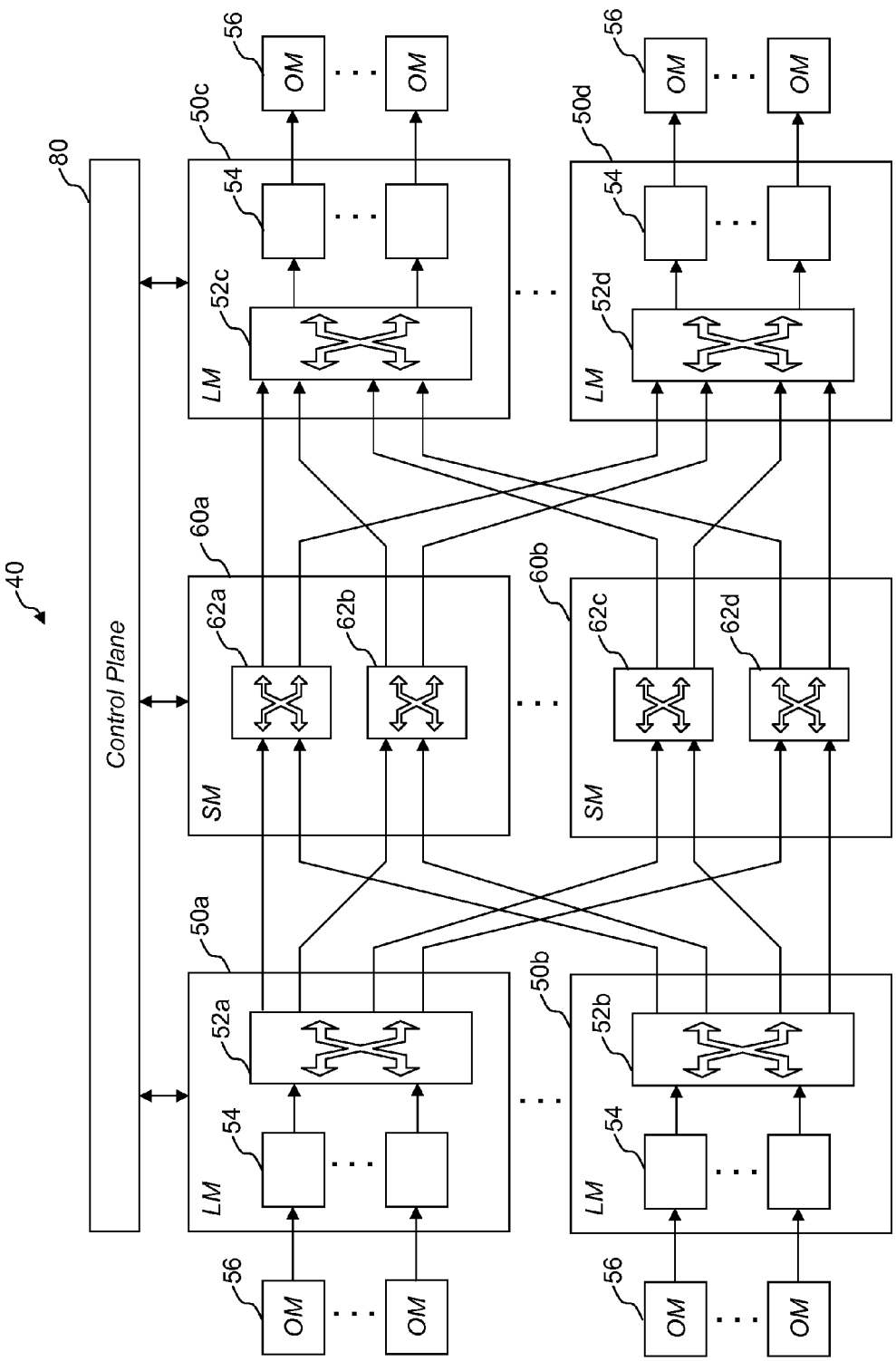
FIG. 3 is a block diagram of a switch with multiple line modules (LM) interconnected through multiple switch modules (SM) according to an exemplary embodiment of the present invention.

Referring to FIG. 3, a switch 40 includes multiple line modules (LM) 50a,50b,50c,50d interconnected through multiple switch modules (SM) 60a,60b with a control plane 70 connected to each of the LMs 50 and SMs 60 according to an exemplary embodiment of the present invention. Each of the LMs 50a,50b,50c,50d includes a switching chip 52 and multiple transceiver circuits 54. Each of the transceiver circuits 54 connects to an optical module (OM) 56. The OM 56 transmits and receives an optical signal, such as an OC-3/STM-1, OC-12/STM-4, OC-48/STM-16, and OC-192/STM-64. The transceiver circuits 54 are configured to perform conversions between optical and electrical to interface the optical signal to the switching chip 52. The switching chip 52 connects each of the multiple transceiver circuits 54 to switching chips 62a,62b,62c,62d on each of the SMs 60a, 60b. Switching chips 62a,62c represent active or working chips and switching chips 62b,62d represent standby or protection chips on SMs 60a,60b. For illustration purposes, the switch 40 shows a single direction with LMs 50a,50b providing ingress and LMs 50c,50d providing egress. Those of ordinary skill in the art will recognize that each LM 50a,50b, 50c,50d can each include both ingress and egress.

In an exemplary embodiment, the switching chips 52,62 are application-specific integrated circuits (ASICs) configured to switch any of any of 18 time slots on each of 32 input data links to any of 18 time slots on each of 32 output data links. Each time slot can correspond to a single STS-1. Each switching chip 52,62 can be viewed as a 576×576 switch element since 18×32=576. The switching chips 52,62 contain a programmable switch map that specifies which input time slot is connected to each output time slot. Multicast is implemented by connecting more than one output time slot to the same input time slot. Multicast fan-out is limited only by the number of output time slots on the switching chip 52,62: a single input time slot can be fanned out to all 576 output time slots. In another embodiment, the switching chips 52,62 can include optical switching components, such as a micro-electro-mechanical system (MEMS)-based switch, inkjet switch, liquid crystal switch, thermal switch, and the like. The present invention of a load-balancing algorithm for a multi-stage switching fabric is contemplated with any physical switching fabric.

The control plane 70 is configured to communicate to all the LMs 50a,50b,50c,50d and SMs 60a,60b, such as through a backplane connection, a direct network connection (e.g., Ethernet), or the like. The control plane 70 can be used to automatically or manually provide commands to the LM 50 and SM 60 modules. For example, connections can be added through an Element Management System (EMS), Network Management System (NMS), or the like, and the control plane 70 can provide commands to direct the addition of the new connection. Additionally, the control plane 70 can provide routing in response to fault conditions, such as module failure or fiber cuts. As described further herein, in an exemplary embodiment of the present invention, the control plane 70 is utilized to direct the LM 50 and SM 60 modules to perform a load-balancing algorithm to determine the best choice of switching chips 62a,62b,62c,62d for each connection from the LMs 50a,50b,50c,50d. Alternatively, the present invention can perform the load-balancing algorithm without a control plane 70 through means such as direct EMS, NMS, and the like connections to each LM 50 and SM 60 module.

Figure 4:
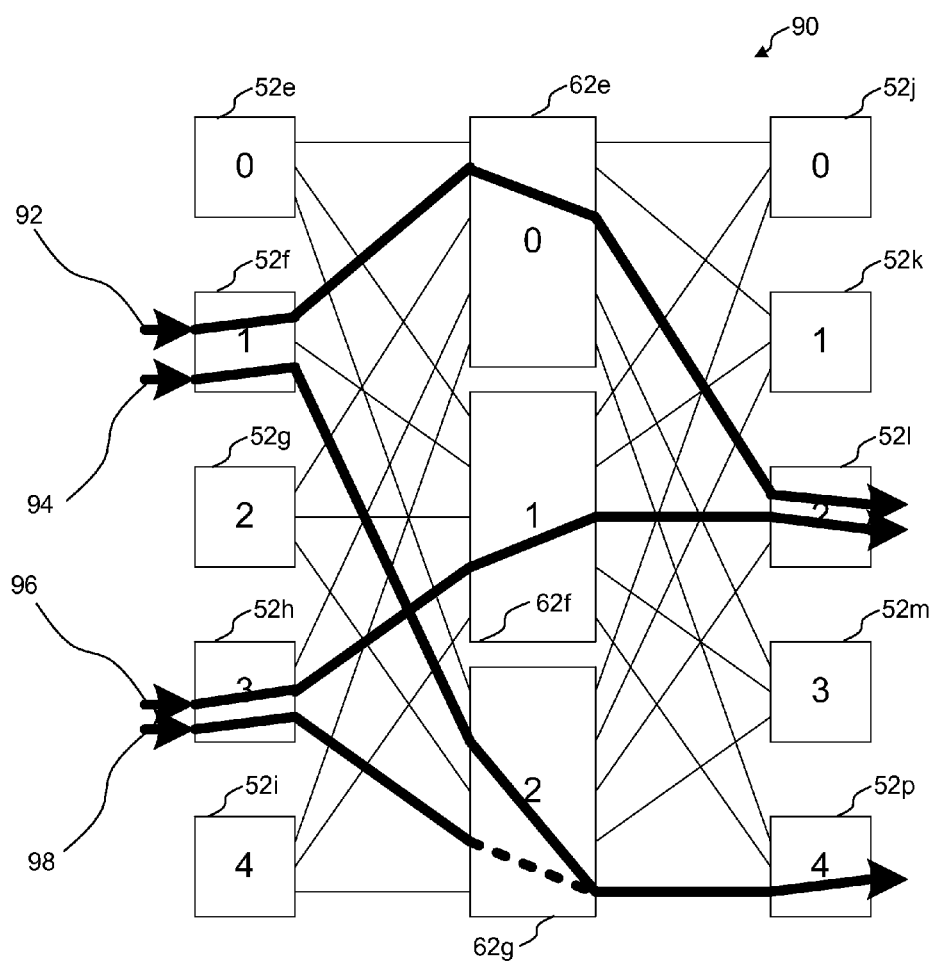
FIG. 4 is a logical diagram of a three-stage switching fabric according to an exemplary embodiment of the present invention.

Referring to FIG. 4, a logical diagram of a three-stage switching fabric 90 is illustrated according to an exemplary embodiment of the present invention. As described herein, the three-stage switching fabric 90 includes switching chips 52e-52p and center-stage switching chips 62e-62g. For illustration purposes, switching chips 52e-52i are shown as ingress chips and switching chips 52j-52p are shown as egress chips, and those of ordinary skill in the art will recognize that each of the chips 52e-52p can perform ingress and egress functionality simultaneously.

A multi-connection slice (hereinafter referred to as a "McSlice") 92,94,96,98 represents the flow of a single timeslot in a single direction across the three-stage fabric 90. Alternatively, in an all-optical switch, a McSlice 92,94,96,98 would represent the flow of a single wavelength in a single direction across the three-switch fabric 90. The present invention provides systems and methods for selecting a center-stage switching chip 62e-62g to handle each McSlice 92,94,96,98. Advantageously, the present invention is a load-balancing heuristic that attempts to spread the McSlices 92,94,96,98 as evenly as possible across the center-stage switching chips 62e-62g which increases the probability that future McSlices can be added without rearranging existing McSlices.

The present invention utilizes a switch programming algorithm to make the best possible local decision for one McSlice at a time, without considering other McSlices that may also need center stage switch assignments. Additionally, the present invention also supports blocking recovery, rollback and background rebalancing features. Additionally, the McSlice may be moved to a new center switch (rearranged) at a later time; when a McSlice must be rearranged, it is moved using a chain pull to avoid a hit to the connection.

Figure 5:
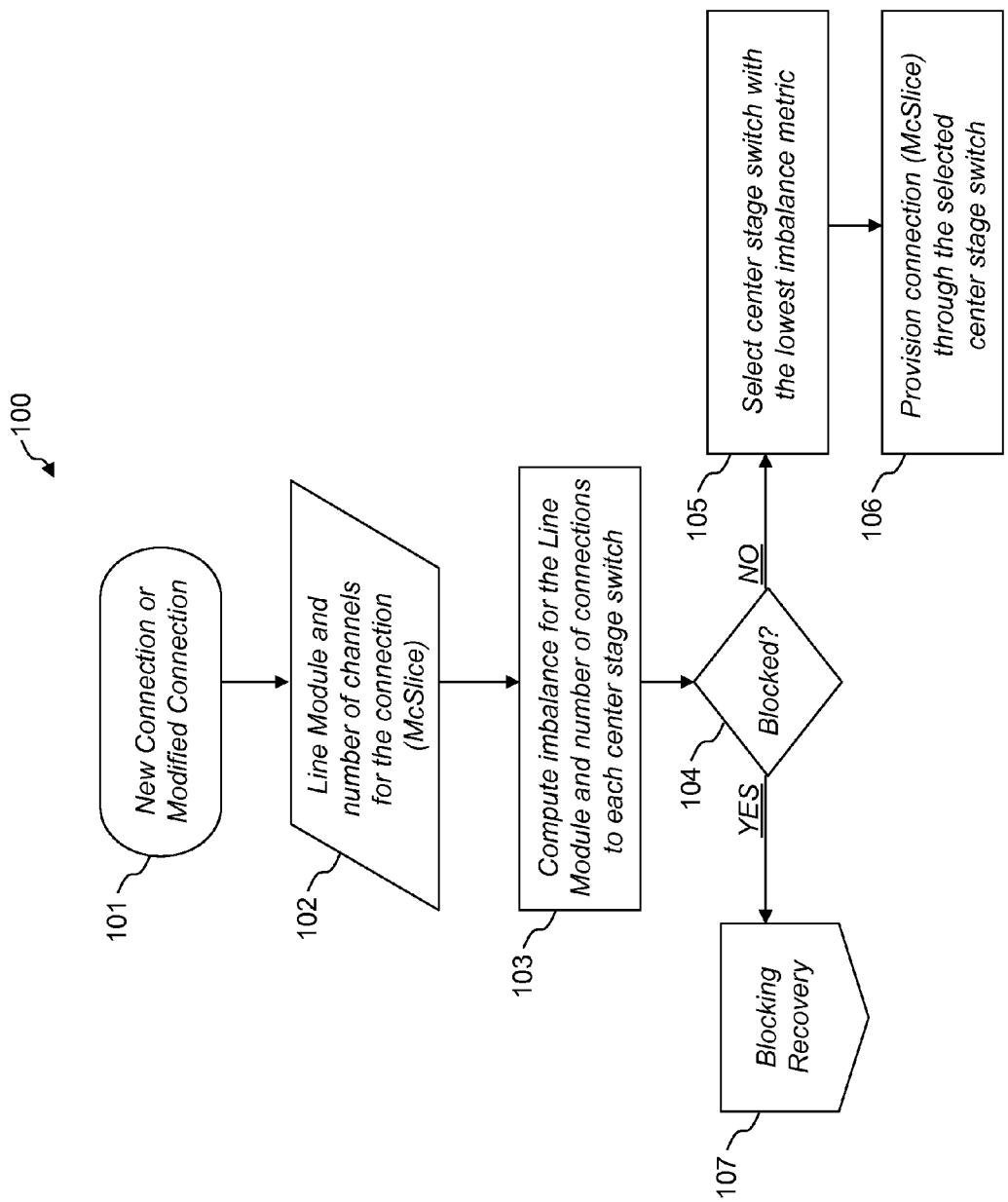
FIG. 5 is a flowchart illustrating a load-balancing algorithm according to an exemplary embodiment of the present invention.

Referring to FIG. 5, a load-balancing algorithm 100 is performed for each new multi-connection slice and modified multi-connection slice according to an exemplary embodiment of the present invention (step 101). The load-balancing algorithm 100 is called with the number of channels required on each LM for a particular connection (McSlice) (step 102). As described herein, the LM includes an ingress and/or egress switch. For example, the LM can include multiple ports, such as optical transceivers, and an ingress and egress switch connected to one or more center stage switches. The time slot numbers on the LM are irrelevant; only the number of channels is important. The output of the algorithm 100 is a center stage switch number, such as 0 to 23 on large-scale optical switch or 0 to 5 on smaller-scale optical switch. The algorithm 100 considers each center switch in turn, selecting the one that best satisfies a load-balancing metric.

The load-balancing algorithm 100 looks at the number of free channels from each required LM (i.e., ingress and egress switch) to the candidate center stage switch. The algorithm 100 considers one center stage switch at a time. As described herein, a link is the path from an ingress switch to the center stage switch to the egress switch. The algorithm 100 is utilized to select the center stage switch for the ingress to egress connection over the link.

For each candidate center stage switch, the algorithm 100 computes the imbalance for each required LM link to that center stage switch (step 103). The imbalance is the difference between the actual number of free channels on that link versus the expected number of free channels which is the average number of free channels on all links from that LM. An imbalance of zero means that the actual number of free channels matches the expected number of free channels. The goal of the algorithm 100 is to achieve an imbalance of zero on all links for that LM, because this means the load is perfectly balanced for that LM. A positive imbalance of +1 means the link has one less free channel than expected (imbalance=expected−actual), +2 means two less free channels than expected, etc. Positive imbalances are to be avoided as much as possible. A negative imbalance means the link has more free channels than expected, which is okay. For a particular candidate center switch, the metric for that center stage switch is the maximum imbalance (worst imbalance) among the LMs that participate in the current connection (McSlice). A large positive imbalance on any LM in the connection will dominate the metric for that candidate center stage switch.

After computing the imbalance for each center stage switch, the algorithm 100 checks to ensure that the connection (McSlice) is not blocked (step 104). Blocking is when no center stage switch is able to reach all of the LMs involved in the new connection. If there is blocking, a blocking recovery algorithm 110 is utilized to compensate for imperfect channel usage if so many links are blocked that a new slice cannot be added (step 107). If not, the algorithm 100 compares the metric for all center switches and selects the center switch with the lowest metric (best worst-case imbalance) (step 105). The algorithm 100 returns the index of the selected center stage switch, and the connection (McSlice) is provisioned through the selected center stage switch (step 106).

The load-balancing algorithm 100 balances traffic across the center stage switches (or switch modules) and it balances the channel usage across the backplane links for each LM. Channels are the scarce resource that is being carefully managed. When all channels are used on a particular backplane link, that link becomes blocked and its LM cannot send any more traffic through that center stage switch. If there are too many blocked links in the switch, it may become impossible to route a new connection in the fabric because every center switch is blocked to some ingress/egress switch on the LM. The switch core can recover in that case by rearranging enough connections to be able to route the new connection, but it is better (i.e., a faster fabric update) not to need rearrangement in the first place.

The load-balancing algorithm 100 does not always balance the channel usage perfectly. Accordingly, the present invention includes two additional mechanisms for adjustments: blocking recovery and background rebalancing. Blocking recovery is utilized to compensate for imperfect channel usage if so many links are blocked that a new slice cannot be added (i.e., when no center stage switch is able to reach all the ingress/egress switches on LMs involved in the new slice). Background rebalancing is periodically run when the switch fabric is idle (i.e., no connections are being added or modified for a predetermined time), and it checks for links with imbalances above a certain threshold and moves random slices off those links without a hit. Both blocking recovery and rebalancing use a chain pull to rearrange slices without hits.

Figure 6:
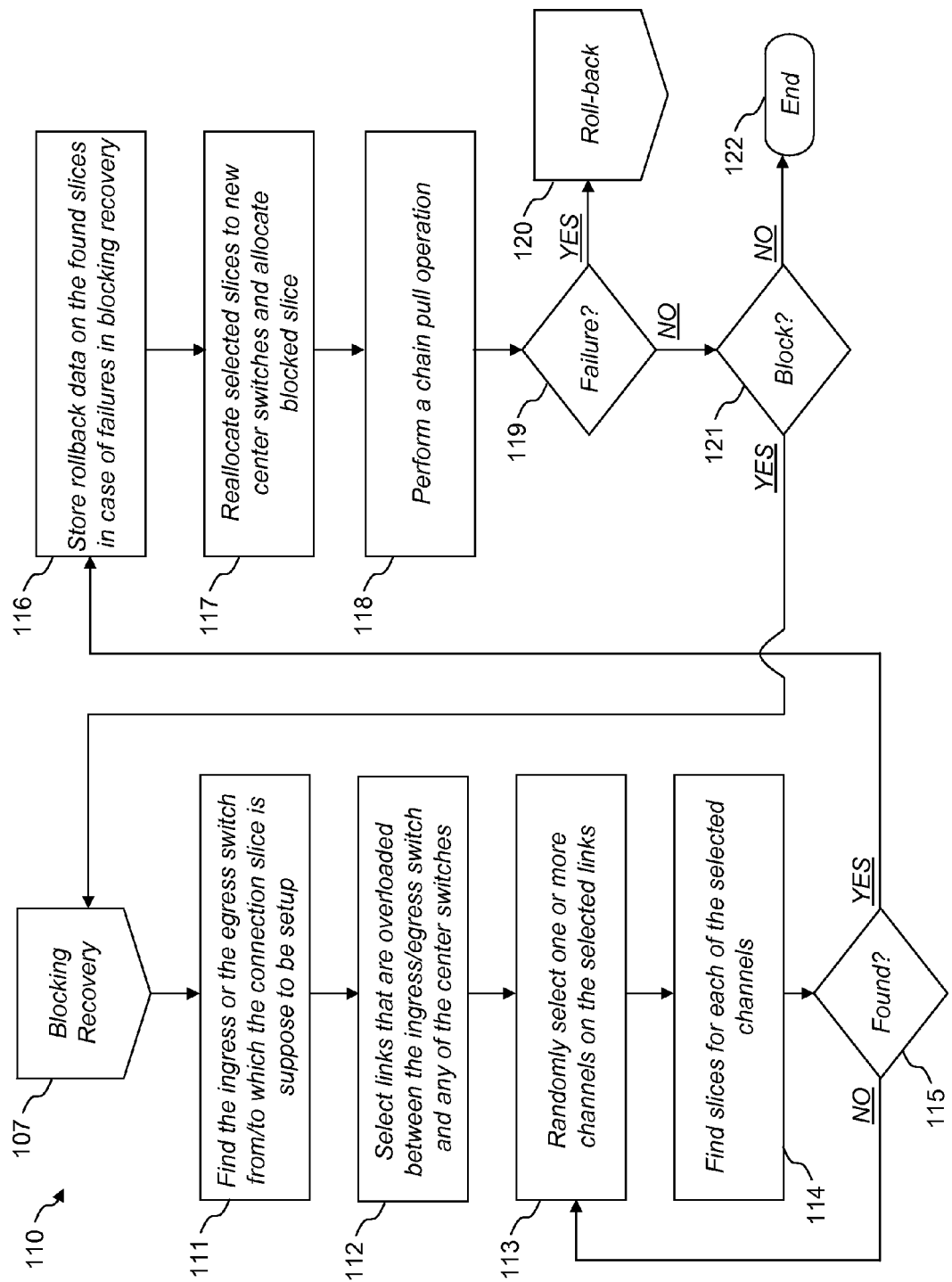
FIG. 6 is a flowchart illustrating a blocking recovery algorithm according to an exemplary embodiment of the present invention.

Referring to FIG. 6, the blocking recovery algorithm 110 is performed to recover links so that a new connection (McSlice) can be added or modified on a blocked linked according to an exemplary embodiment of the present invention. The algorithm 110 begins by finding the ingress or egress switch on the LM from/to which the connection slice is supposed to be setup (step 111). A link that is overloaded is selected between the ingress/egress switch and any of the center stage switches (step 112). The selected link is overloaded with McSlice connections by an amount that is above the average (call the amount 'numToRearrange'). The algorithm 110 will rearrange only (i.e., numToReArrange) some of the McSlices that are on the link found in the step above.

The algorithm 110 randomly selects one or more channels (e.g., numToRearrange channels) on the link between the ingress/egress switch on the LM and the center switch (step 113). Next, the algorithm 110 finds connection slices for each of the randomly selected channels (step 114). The algorithm 110 checks to see if connection slices are found (step 115). Sometimes there may not be any slices on the randomly selected channels if the link is used lightly. Because of this, even though the algorithm 110 seeks to rearrange numToRearrange slices, it may not actually do so. This is the major change from existing rearrangement schemes. Even though numToRearrange slices are not rearranged, algorithm 110 still unblocks the link. If the no connection slice is found, then the algorithm 110 repeats the process of selecting random channels on the link by returning to step 113.

Due to the random procedure, the blocking recovery may sometimes fail. Accordingly, rollback data is stored on the found slices in case of failures in blocking recovery (step 116). The rollback data is used to place the slices exactly like the way they were before the rearrangement, and is described in FIG. 8. The selected slices are reallocated to new center stage switches along with the slice that was initially setup which was blocked (i.e., the connection which could not be added due to blocking) (step 117). This includes removing the slices from the current center stage switch, freeing all resources allocated to the slices, and marking it for reallocating all the needed resources for the slice. A chain pull operation is performed (step 118). As described herein, the chain pull operation is a hitless update achieved by writing the new configuration to the standby bank of center stage switches and then doing a global active/standby bank swap between the active and standby center stage switches. Once this is complete, the algorithm repeats step 113.

If the chain pull operation fails (step 119), then the blocking recovery algorithm 110 goes to a rollback algorithm to return the slices back (step 120). If the chain pull is successful (step 119), then the blocking recovery algorithm 110 checks to see if blocking still occurs (step 121). Here, the chain pull operation may be successful in terms of reallocating the found links, but there still may be blocking preventing slices from being added. As such, the algorithm 110 repeats. Statistically, the algorithm 110 converges rapidly on a solution where all McSlices are placed in the fabric. To guard against an infinite loop, the blocking recovery algorithm 110 can be aborted after a large number of rearrangements. For example, the large number can be set roughly equal to the number of unidirectional time slots in the fabric. Here, if the large number of rearrangements is exceeded, then the decision in step 121 can be set to end in step 122. Also, if there is no blocking after the chain pull, then the algorithm 110 ends (step 122). Advantageously, the algorithm 110 performs multi-connection slice rearrangement across center stage switches in a hitless manner. By selecting a few random slices to remove (i.e., numToRearrange) from the link on the LM, the algorithm guarantees that the new connection (McSlice) can be added.

Figure 7:
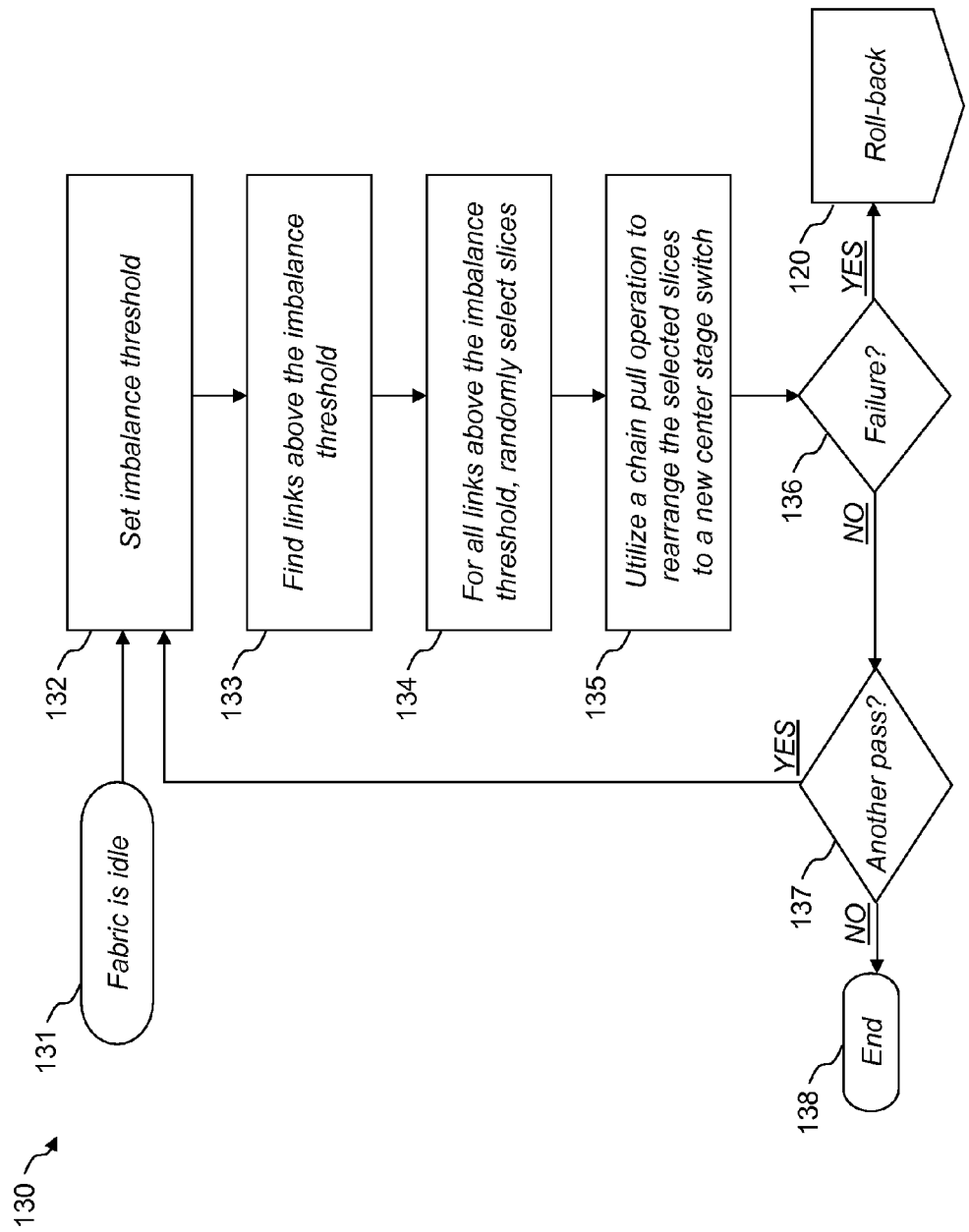
FIG. 7 is a flowchart illustrating a background rebalancing algorithm according to an exemplary embodiment of the present invention.

Referring to FIG. 7, a background rebalancing algorithm 130 is a proactive measure to reduce imbalances in the center stage switches according to an exemplary embodiment of the present invention. The algorithm 130 is run when the fabric is idle (step 131). For example, the algorithm 130 can be set to run 20 seconds after the last fabric update finishes or after a provisionable time period. An imbalance threshold is set (step 132). The background rebalancing algorithm 130 checks for links with imbalances above a certain threshold. For example, the imbalance threshold can be set to +3, +2, +1, etc. The algorithm 130 is performed over several iterations and the imbalance threshold can be modified each time. In one example, the background rebalancing algorithm 130 does four passes over the fabric, with the imbalance threshold set to +3, +2, +1, and again +1. These are arbitrary thresholds but they have been determined to give reasonable performance for background rebalancing. Sometimes the first pass of threshold +1 fails to rearrange the fabric sufficiently because the rearranged slices land on links whose imbalance gets bumped up, so a second pass at threshold +1 helps by picking another random set of slices to rearrange.

In each pass of the background rebalancing algorithm 130, all links above the imbalance threshold are found (step 133). For each of these links, slices are randomly selected for rebalancing (step 134). Additionally, roll-back data can be stored once for the randomly selected slices, and this data is used if the chain pull operation fails to perform a roll-back. A chain pull operation is utilized on the randomly selected slices to rearrange the slices to a new center stage switch (step 135). If the chain pull operation fails (step 136), then the background rebalancing algorithm 130 goes to a rollback algorithm to return the slices back (step 120). If the chain pull operation is successful (step 136), the algorithm 130 determines if another pass is needed (step 137). As described herein, the background rebalancing algorithm 130 can be set to perform multiple iterations each with a different imbalance threshold level. If another pass is determined, then the algorithm 130 goes back to step 132. If not, then the algorithm 130 ends (step 138).

Both the blocking recovery algorithm 110 and background rebalancing algorithm 130 use a chain pull to rearrange slices without hits. It is possible that an LM will suddenly stop responding in the middle of a chain pull update, before pulling the chain, blocking completion of the chain pull. Usually this means the LM began rebooting during the chain pull update. There are a number of ways to handle this situation, but many of them are unacceptable. Blocking all fabric updates until the LM finishes rebooting would take too long, which is unacceptable. Pulling the chain anyway despite the rebooting LM is also unacceptable. Applying the pending updates to the active switch bank could cause unwanted traffic hits, which is also unacceptable.

Figure 8:
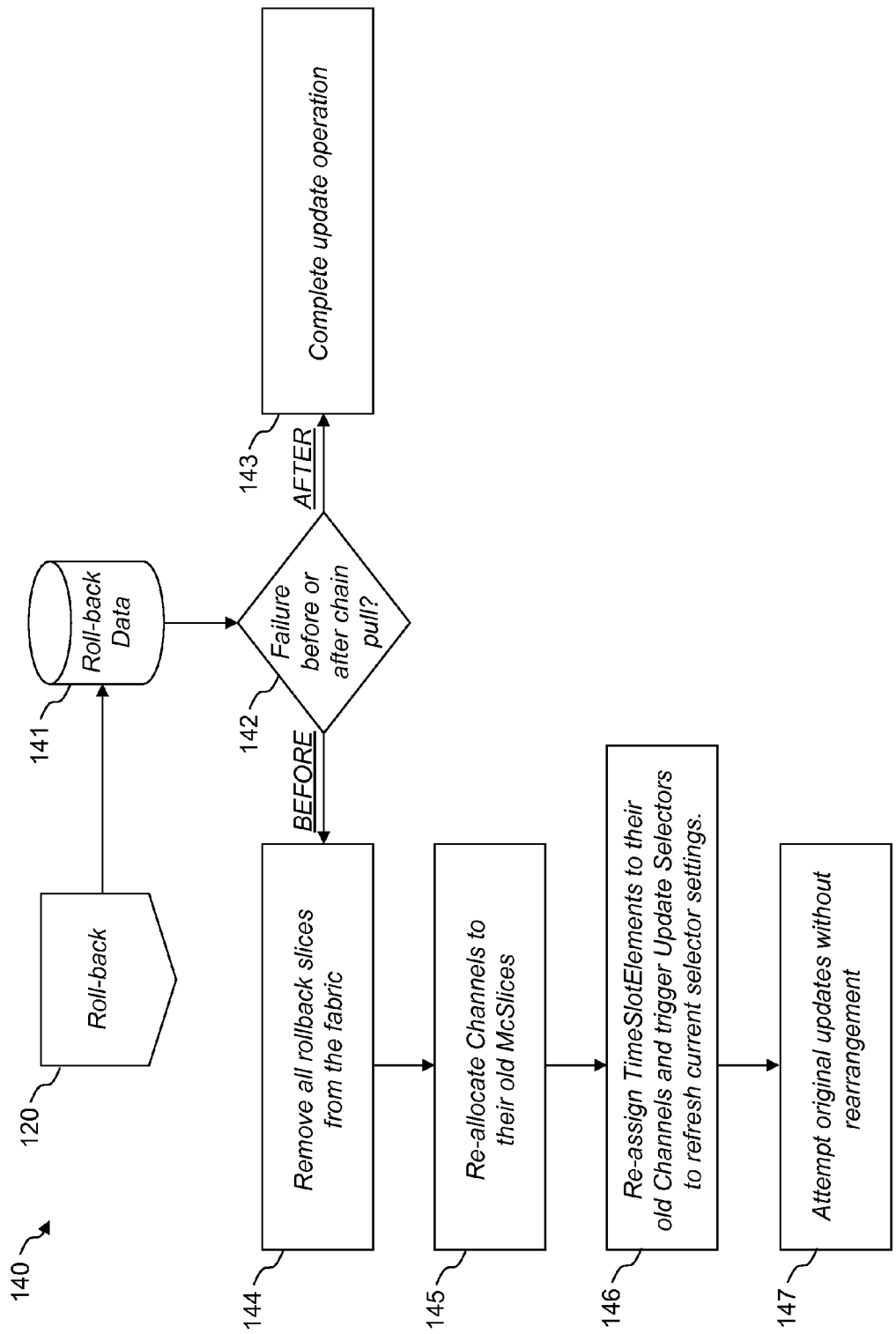
FIG. 8 is a flowchart illustrating a rollback algorithm according to an exemplary embodiment of the present invention.

Referring to FIG. 8, a rollback algorithm 140 utilizes rollback data 141 in order to roll back rearrangements if the chain pull update must be aborted or fails according to an exemplary embodiment of the present invention. As described herein, when blocking recovery or background rebalancing occurs, random slices may be rearranged without hits in the switch fabric. The hitless update requires a chain pull, and there is a chance that the chain pull could fail because an LM suddenly stops responding to fabric update messages without going to FROZEN state. Since updates have already been applied to the fabric but cannot be completed without a hit (i.e., because the LM is not responding), the rollback algorithm 140 is utilized to back out the rearrangements. Rollback data 141 is collected on certain objects when an update includes blocking recovery or background rebalancing, so that rollback can be performed if necessary. The rollback operation restores the fabric configuration objects to match what is already configured in the active bank of the switches.

The rollback data includes a partial snapshot of the fabric configuration at the time that rearrangement began. Rollback data 141 is stored only on slices that get rearranged. The rollback data 141 includes a snapshot of all the values that get changed during rearrangement, so the old values and object associations can be restored during rollback. The rollback data 141 can include the following information:

| Title | Description |
|---|---|
| GreedyManager::mHasRollbackData | A global flag indicating whether to collect rollback data |
| McSlice::msRollbackSlices | A global list of all McSlice objects with rollback data |
| McSlice::mRollbackCenterSwitch | The old center stage switch assignment for a slice |
| Channel::msRollbackChannels | A global list of all Channel objects with rollback data |
| Channel::mpRollbackSlice | The old McSlice that this Channel was assigned to |
| Channel::mpRollbackMasterTs | The old master TimeSlotElement, which had the Channel pool |
| TimeSlotElement::mpRollbackChannel | The old Channel associated with this TimeSlotElement |

Note that a TimeSlotElements points to its rollback Channel, but a Channel does not point to its rollback TimeSlotElements. Similarly, a Channel points to its rollback McSlice but a rollback McSlice does not point to its rollback Channels, and a McSlice does not point to its TimeSlotElements. Instead, it finds them using a nested loop, iterating over its Flows and BridgeSelectElements. The data structures were designed to minimize memory overhead and run time overhead when building the rollback data 141, possibly at the expense of slightly slower rollback time.

It is also possible that a McSlice has no center stage switch assignment when rollback data is collected. In that case, the McSlice is removed from the fabric if rollback is performed. In this case, McSlice::mRollbackCenterSwitch is set to CS_UNASSIGNED and there is no Channel or TimeSlotElement rollback data for this McSlice.

The rollback algorithm 140 determines when the failure occurred, i.e., before or after the chain pull operation (step 142). If the failure is after the chain is pulled, then the update operation is completed (step 143). There is a message exchange with LMs after pulling the chain, to apply the fabric changes to the new standby switch bank. If an LM fails to respond during this message exchange (after 3 retries) after pulling the chain, the overall update operation simply completes without that LM. Skipping the LM has no effect on traffic since just the standby switch bank was getting updated; the active switch bank already has the latest fabric updates. The LM's ingress and egress switches will be completely reprogrammed once the LM recovers, ensuring that the update is eventually applied to both switch banks on that LM before pulling the chain again.

If the failure is before pulling the chain, the rollback data 141 is used to remove all rollback slices from the fabric (step 144). This frees up any channels that are currently used by rollback slices and that might have been previously allocated to other slices. Next, channels are reallocated to their old McSlices (step 145). Each channel object in the rollback data 141 contains the parameters needed to allocate it back to its rollback McSlice. A special channel allocation routine is called to allocate a specific channel rather than allocating the next available Channel on the link. This is important because the fabric configuration must be rolled back to match what is already configured in the active banks of the switches. TimeSlotElements in the rollback data 141 is reassigned to their old channels, and Update Selectors are triggered to refresh current selector settings (step 146).

After rollback, the original updates are attempted again without rearrangement (step 147). These updates are applied to the fabric using an active/standby update. Some new slices might remain blocked if rearrangement is not allowed, but the traffic impact will be limited to the new slices. Other unrelated slices will not experience seemingly arbitrary traffic hits in this case.

The fabric update will usually complete without rollback being necessary. In that case, the rollback data 141 is cleared after applying the fabric update. It is also possible for some rollback data to become stale while the LMs are programmed and if a protection switch or a command like Modify Cross Connect or Delete Cross Connect is received while waiting for LM replies. If this happens, the stale data is removed from the rollback data 141. The stale data may be removed immediately or it may be removed in steps 145 and 146.

Referring to FIGS. 9-18, an illustration of the load-balancing algorithm 100 is depicted according to an exemplary embodiment of the present invention. FIGS. 9-18 each show a connection diagram 220 and a switch diagram 230 for an exemplary three-stage switching fabric with five ingress/egress switches and three center stage switches. The connection diagram 220 includes ingress/egress ports for each LM to each switch module. As described herein, each LM includes both ingress and egress ports, and each of these ports connects to each of the center stage switches. The connection diagram 220 provides a graphical representation of the connection from ingress switch on a LM to center stage switch to egress switch on a LM. The switch diagram 230 provides a visual representation of a McSlice through the ingress, center stage, and egress switches. FIGS. 9-18 illustrate adding new connections sequentially with the load-balancing algorithm 100.

Figure 9:
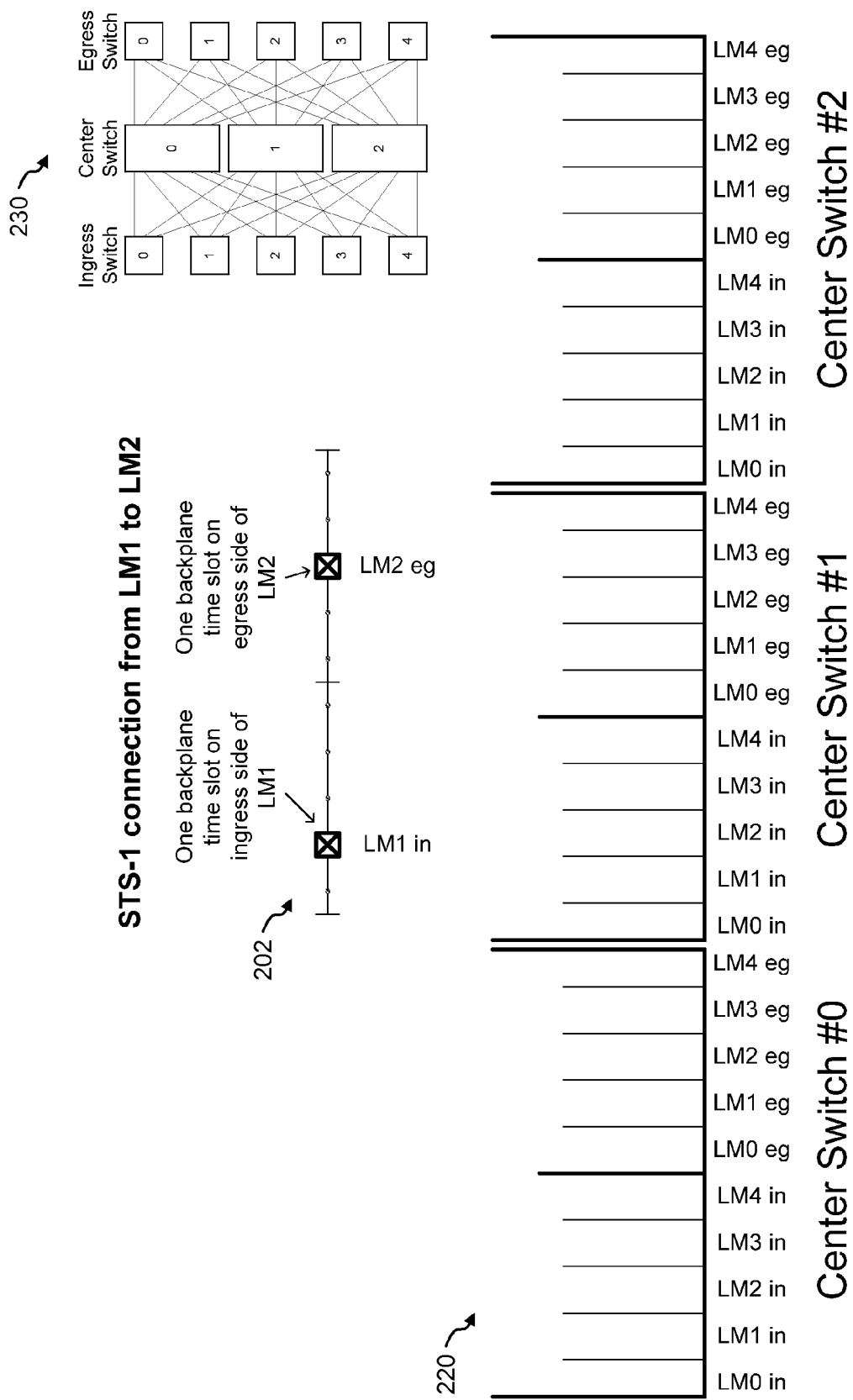
FIGS. 9-18 are graphical representations an exemplary operation of the load-balancing algorithm according to an exemplary embodiment of the present invention.
Figure 10:
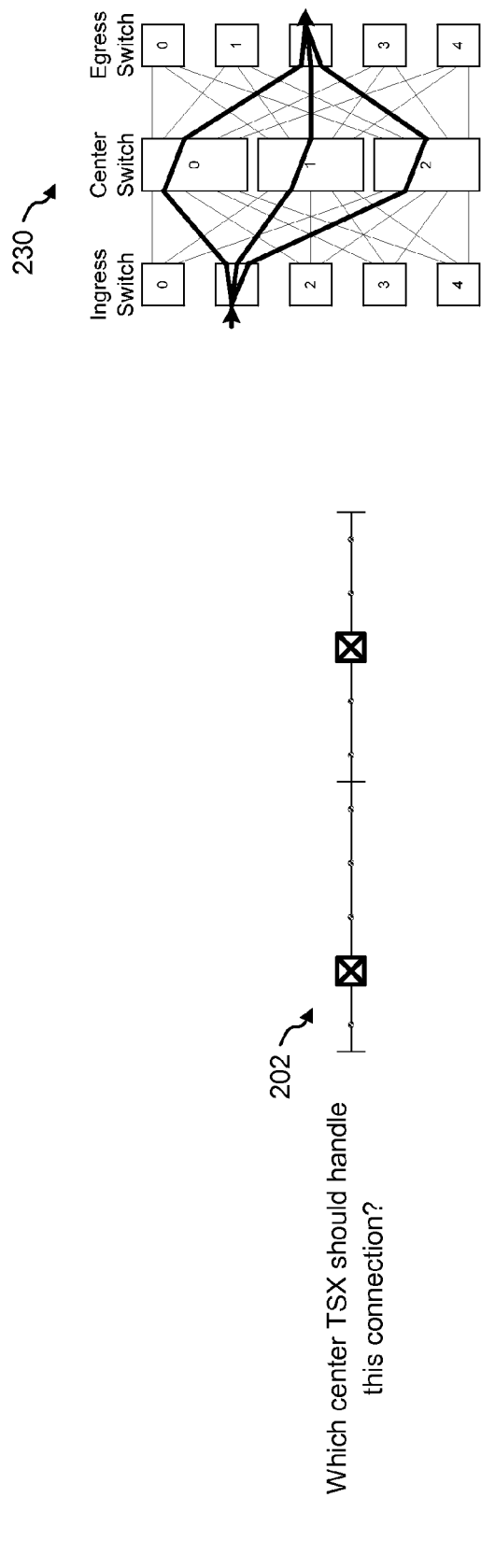
Figure 10:
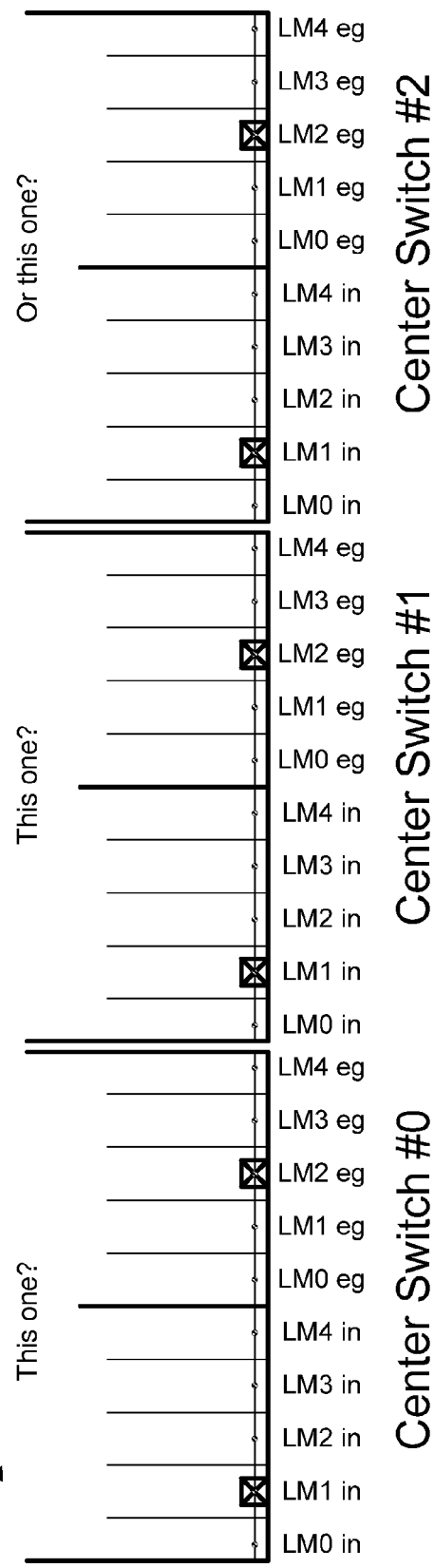
Figure 11:
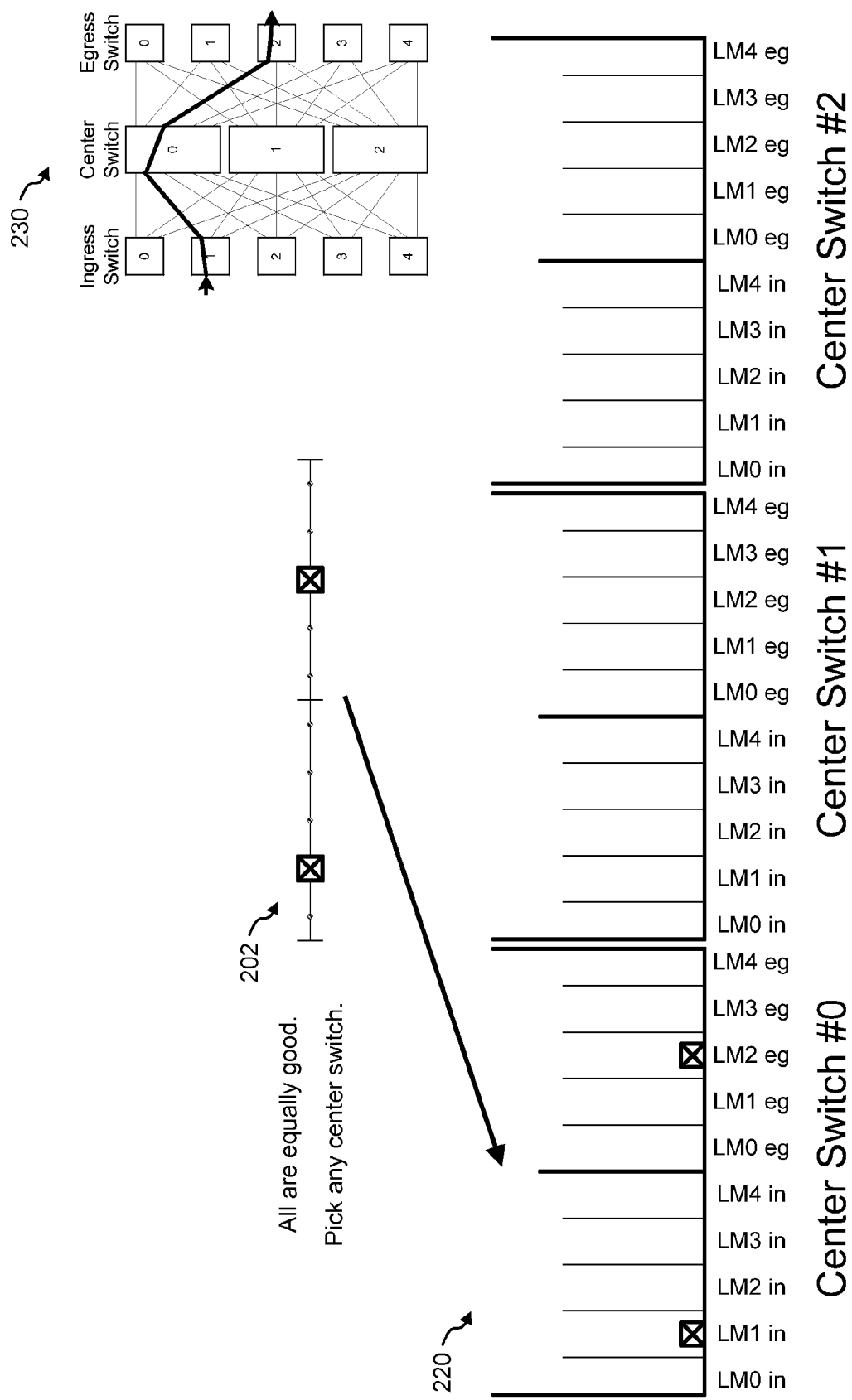

In FIG. 9, a connection 202 is received from the ingress switch on LM1 to the egress switch on LM2. In FIG. 10, the algorithm 100 computes the imbalance for each of the three center stage switches for connection 202. The imbalance is zero for all three center stage switches because no connections are provisioned. The switch diagram 230 shows the three different McSlice paths that connection 202 could take depending on which center stage switch is selected. In FIG. 11, the first center stage switch is selected (center stage switch #0) since the imbalances are all equal to zero, i.e., all center stage switches are equally acceptable for the McSlice. Note, when there are multiple possible selections for the center stage switch, the algorithm 100 can randomly select a center stage switch.

Figure 12:
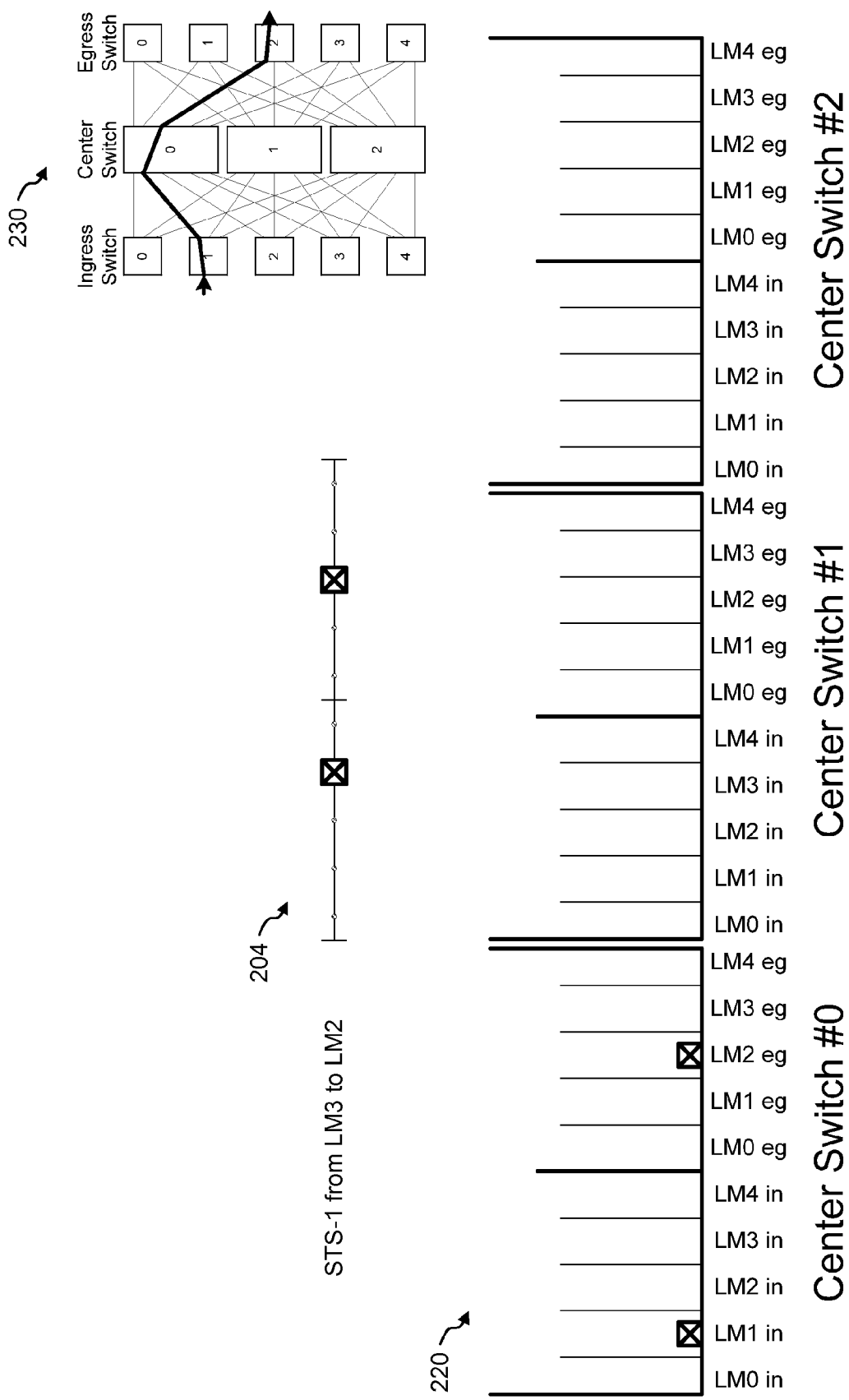
Figure 13:
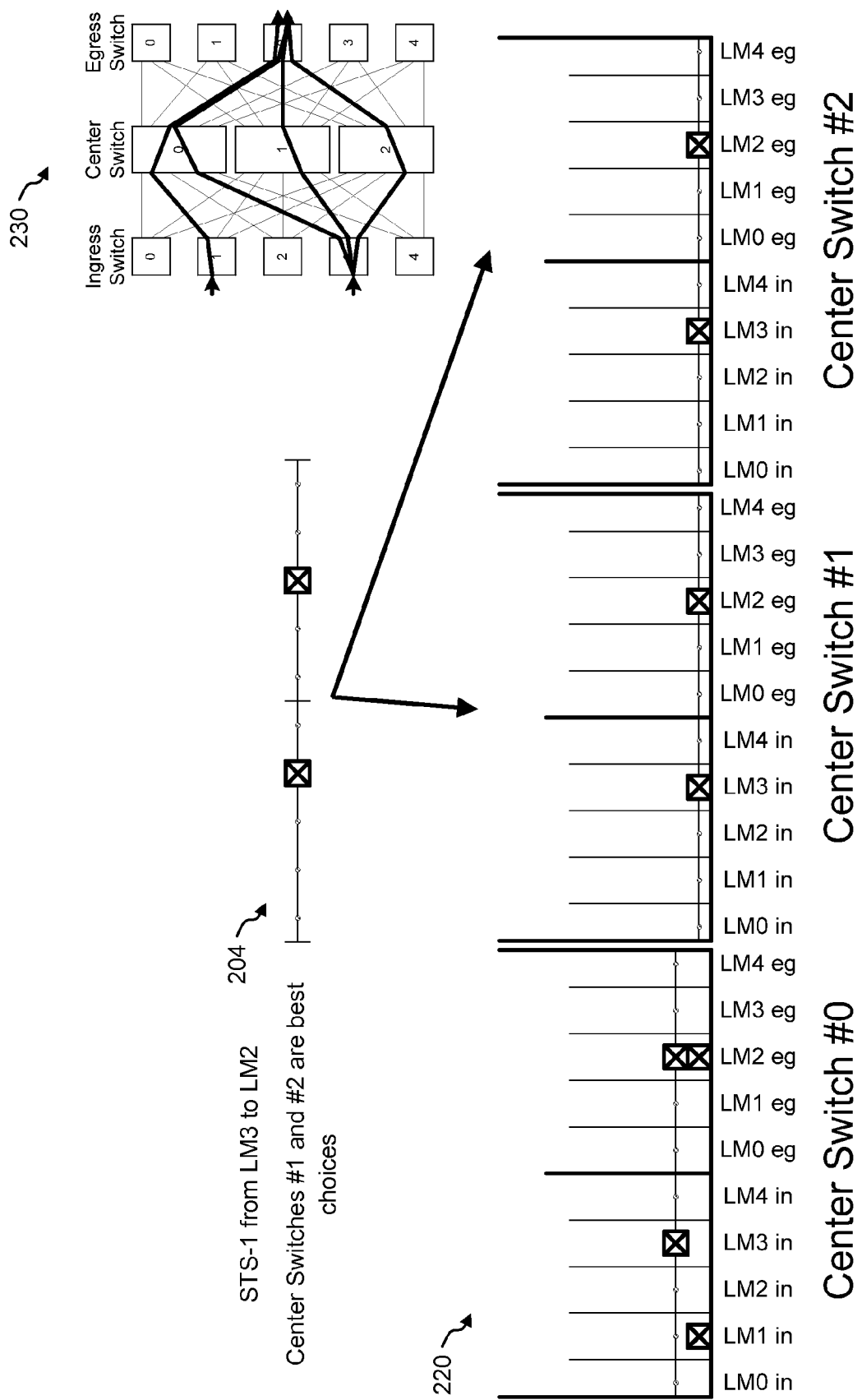
Figure 14:
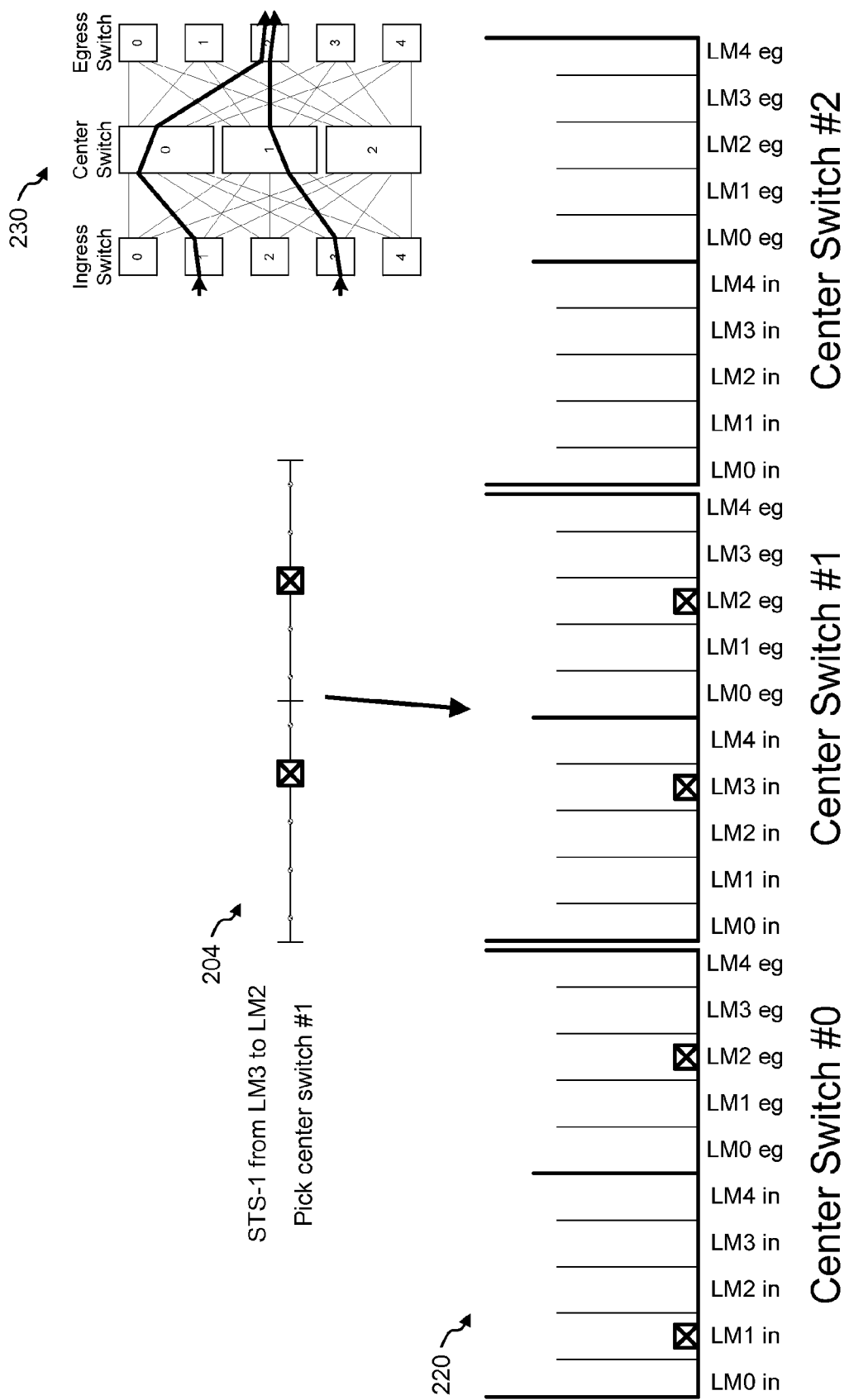

In FIG. 12, a second connection 204 is received from the ingress switch on LM3 to the egress switch on LM2. In FIG. 13, the algorithm 100 computes the imbalance for each of the three center stage switches for connection 204. The imbalance is one for center stage switch #0 and zero for center stage switches #1 and #2 because connection 202 already utilizes a link between the egress switch on LM2 and center stage switch #0. In FIG. 14, the second center stage switch is selected (center stage switch #1) since the imbalances are zero for that and the third center stage switch.

Figure 15:
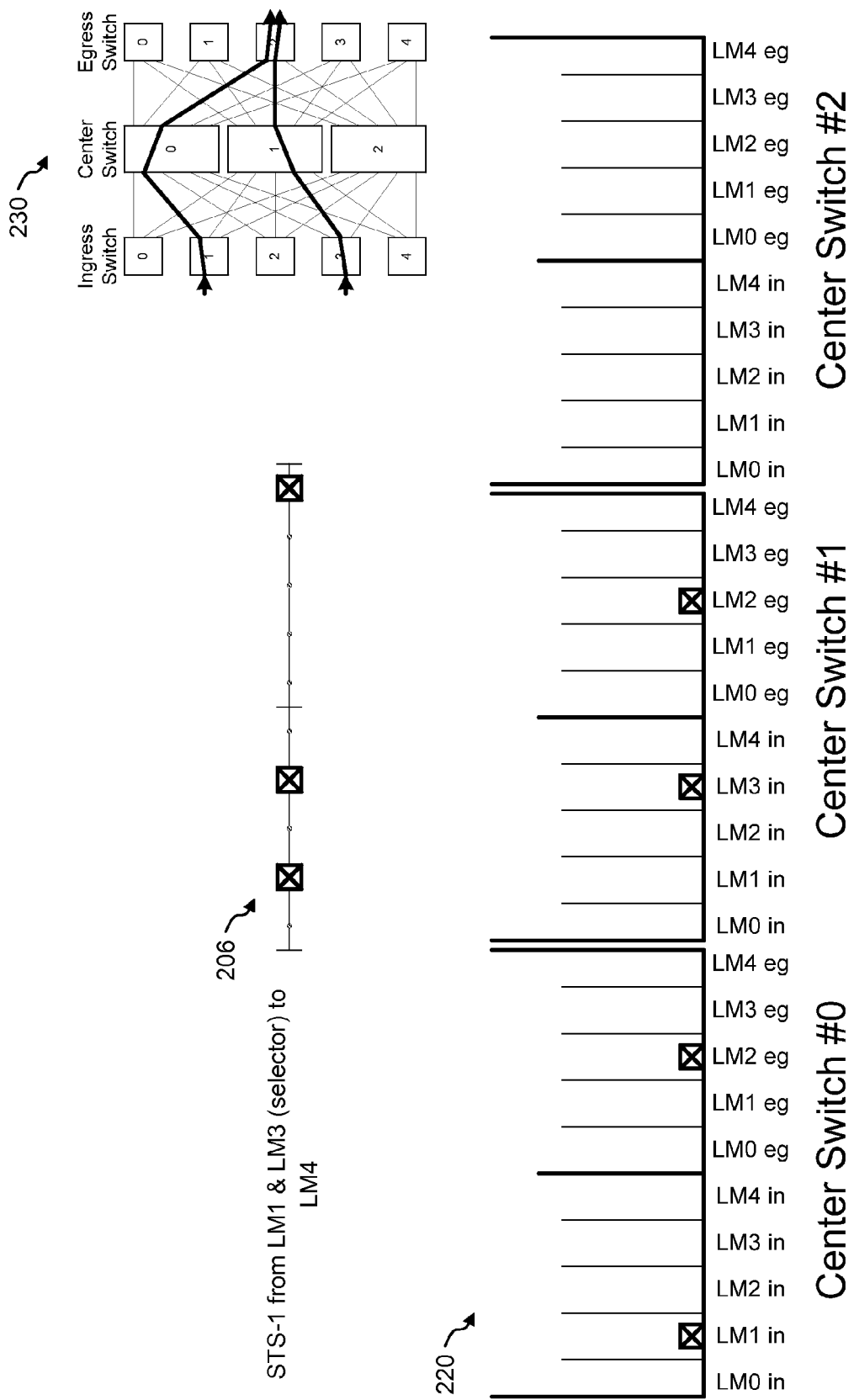
Figure 16:
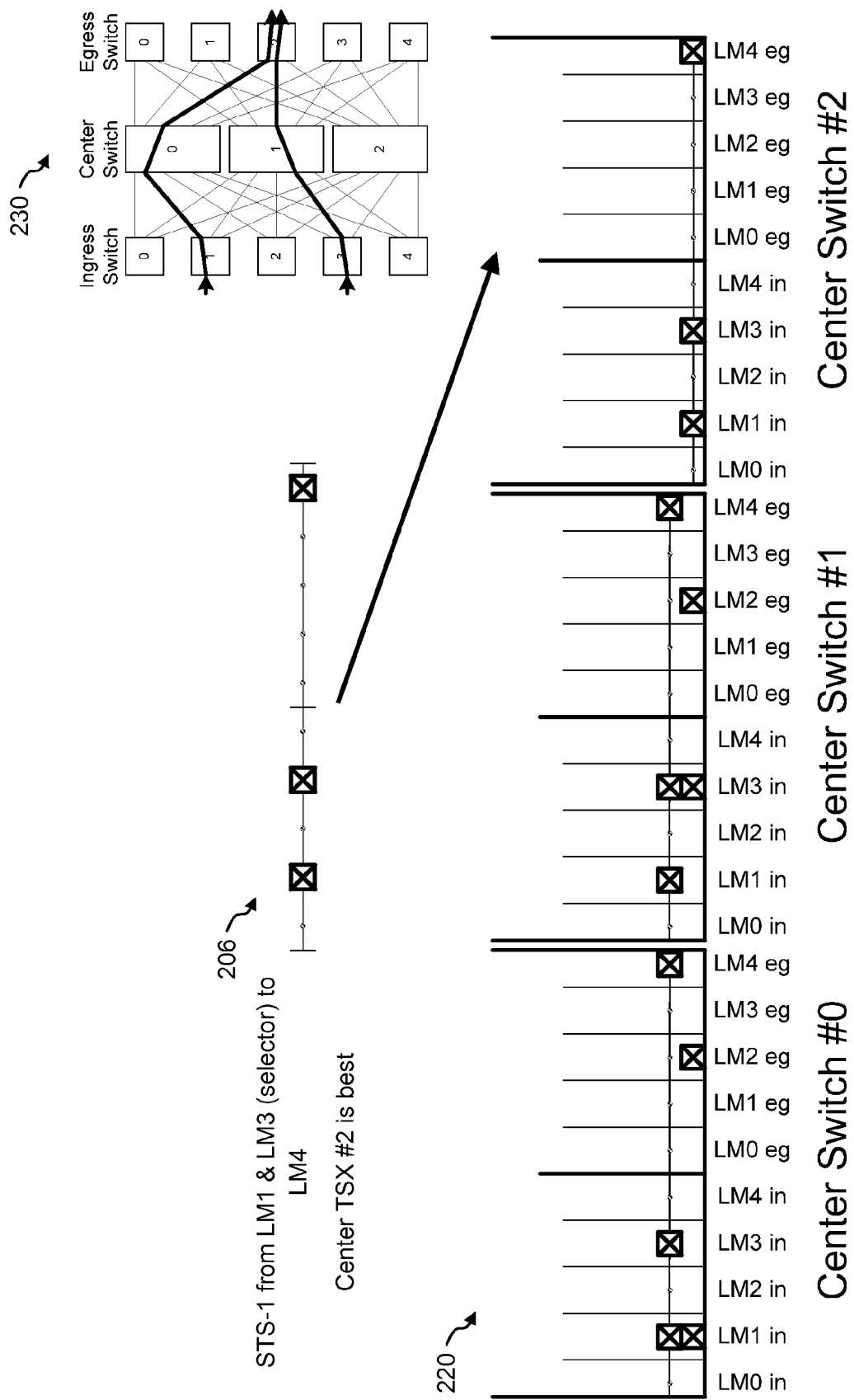
Figure 17:
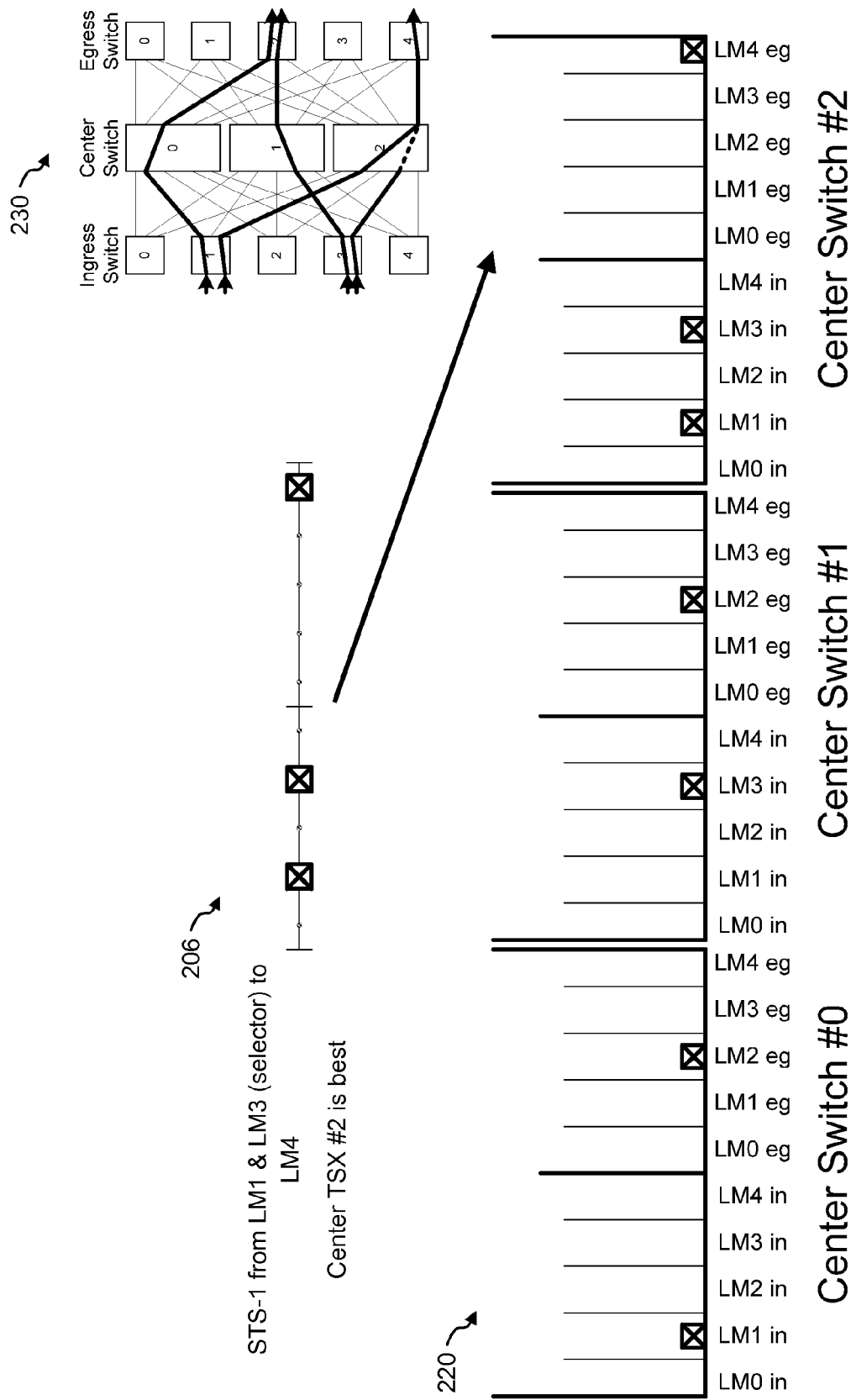
Figure 18:
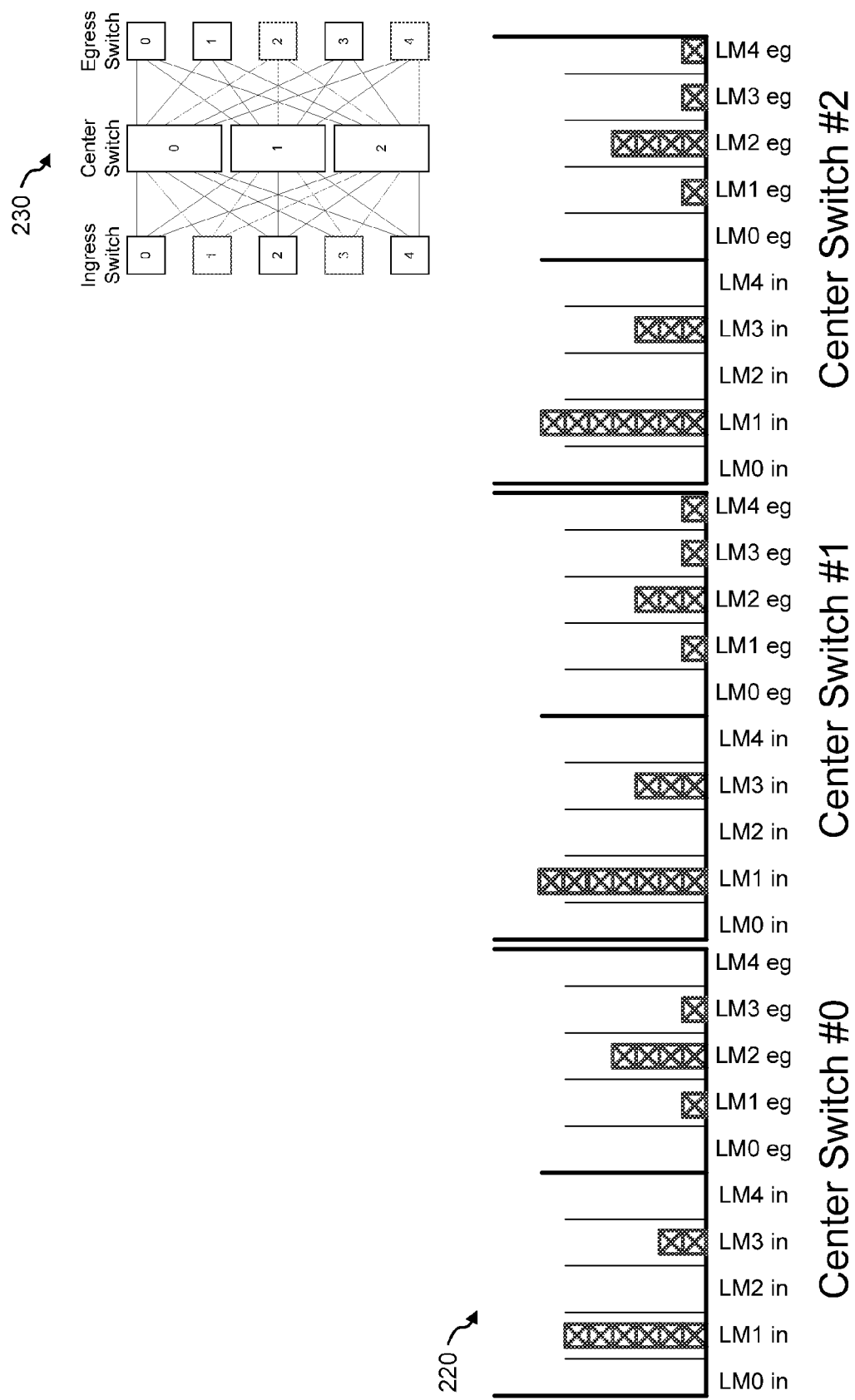

In FIG. 15, a third connection 206 is received from the ingress switch of both LM1 and LM3 to the egress switch of LM4. This can be a protected link where the ingress switch of LM1 and LM3 provides a selector functionality to determine which McSlice is active and standby to the egress switch of LM4, such as using SONET/SDH protection bytes or the like. In FIG. 16, the algorithm 100 computes the imbalance for each of the three center stage switches for connection 206. The imbalance is one for center stage switch #0 because connection 202 shares the LM1 ingress switch link and for center stage switch #1 because connection 204 shares the LM3 ingress switch link. The imbalance is zero for center stage switch #2. In FIG. 17, the connection is provisioned through center stage switch #2 with diagram 230 illustrating the three McSlice connections balanced over the center stage switches. FIG. 18 illustrates the connection diagram 220 after several additions and modifications of new connections, and the associated balance achieved with the load-balancing algorithm 100.

Figure 19:
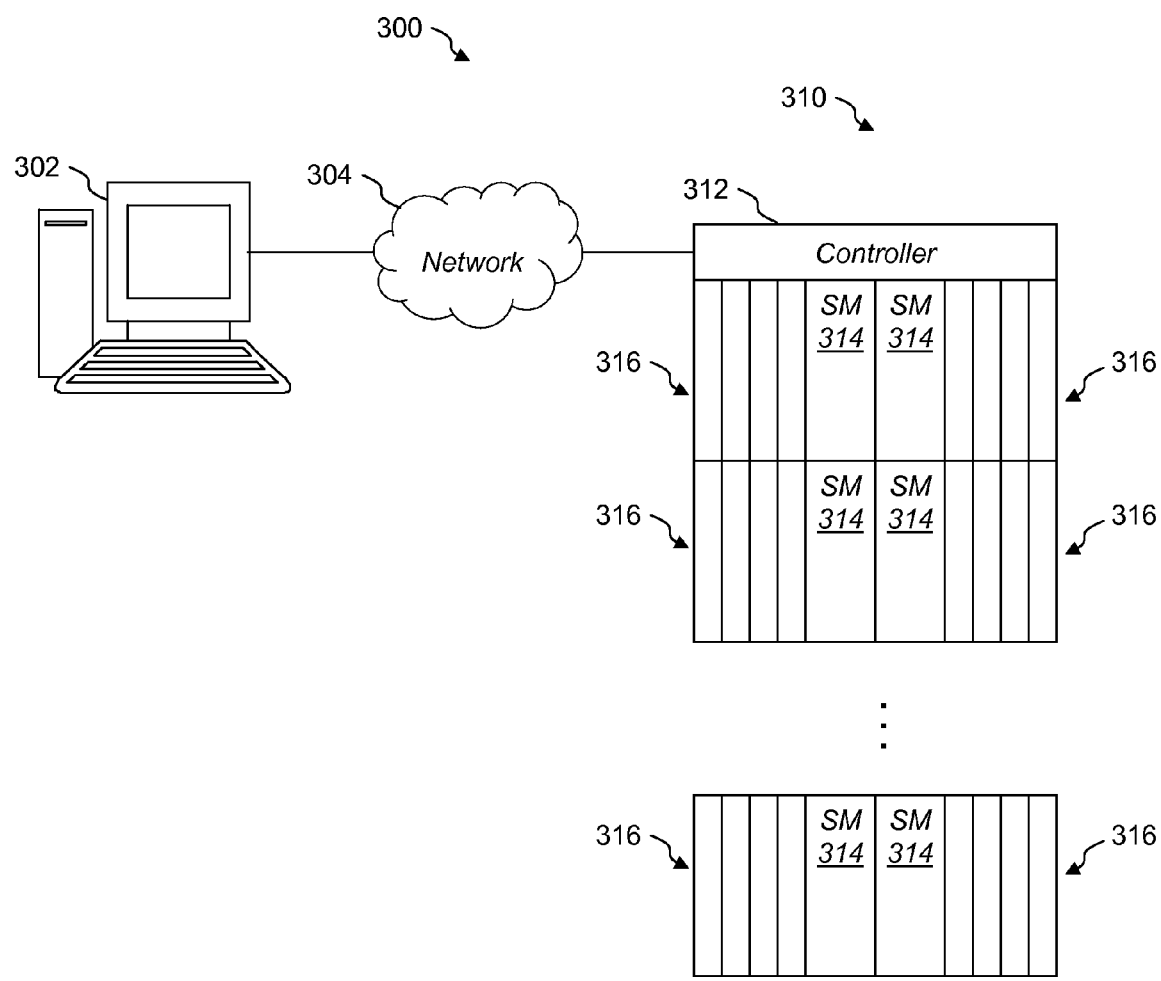
FIG. 19 is a block diagram of a management system connected through a network to a switch network element in an exemplary embodiment of the present invention.

Referring to FIG. 19, a management system 302 connects through a network 304 to a switch network element 310 in an exemplary embodiment of the present invention. The management system 302 can include an element management system (EMS), network management system (NMS), operational support system (OSS), craft interface (CI), and the like. The network 304 can include Ethernet, Internet Protocol, Asynchronous Transfer Mode, RS-232, and the like. The management system 302 is configured to perform operations, administration, maintenance, and provisioning (OAM&P) at both a network level and at a network element level, and is capable of controlling multiple switch network elements 302.

The switch network element 310 can include an optical switch operating at SONET/SDH timeslot granularity, an optical switch operating at wavelength-level granularity, and the like. The switch network element 310 includes a controller 312, multiple switch modules 314, and multiple line modules 316. The components (312, 314, and 316) are each in communication with one another, such as through a backplane, direct optical/electrical connections, and the like.

In an exemplary embodiment of the present invention, the switch network element 310 is configured to utilize the algorithms 100, 110, 130, and 140 described herein to perform load-balancing, blocking recovery, background rebalancing, and rollback, respectively. The controller 312 is configured to communicate to each module 314, 316 within the network element 310, and to communicate to/from the management system 302. The controller 312 can be configured to automatically perform the algorithms 100, 110, 130, and 140 responsive to conditions such as an idle fabric, a fault condition (e.g., fiber cut or module 312, 314 failure), addition of a new connection from the management system 302, modification of an existing connection from the management system 304, and the like. Also, the controller 314 can be configured to manually perform the algorithms 100, 110, 130, and 140 responsive to conditions such as a user-request, a user-defined maintenance routine, and the like.

Figure 20:
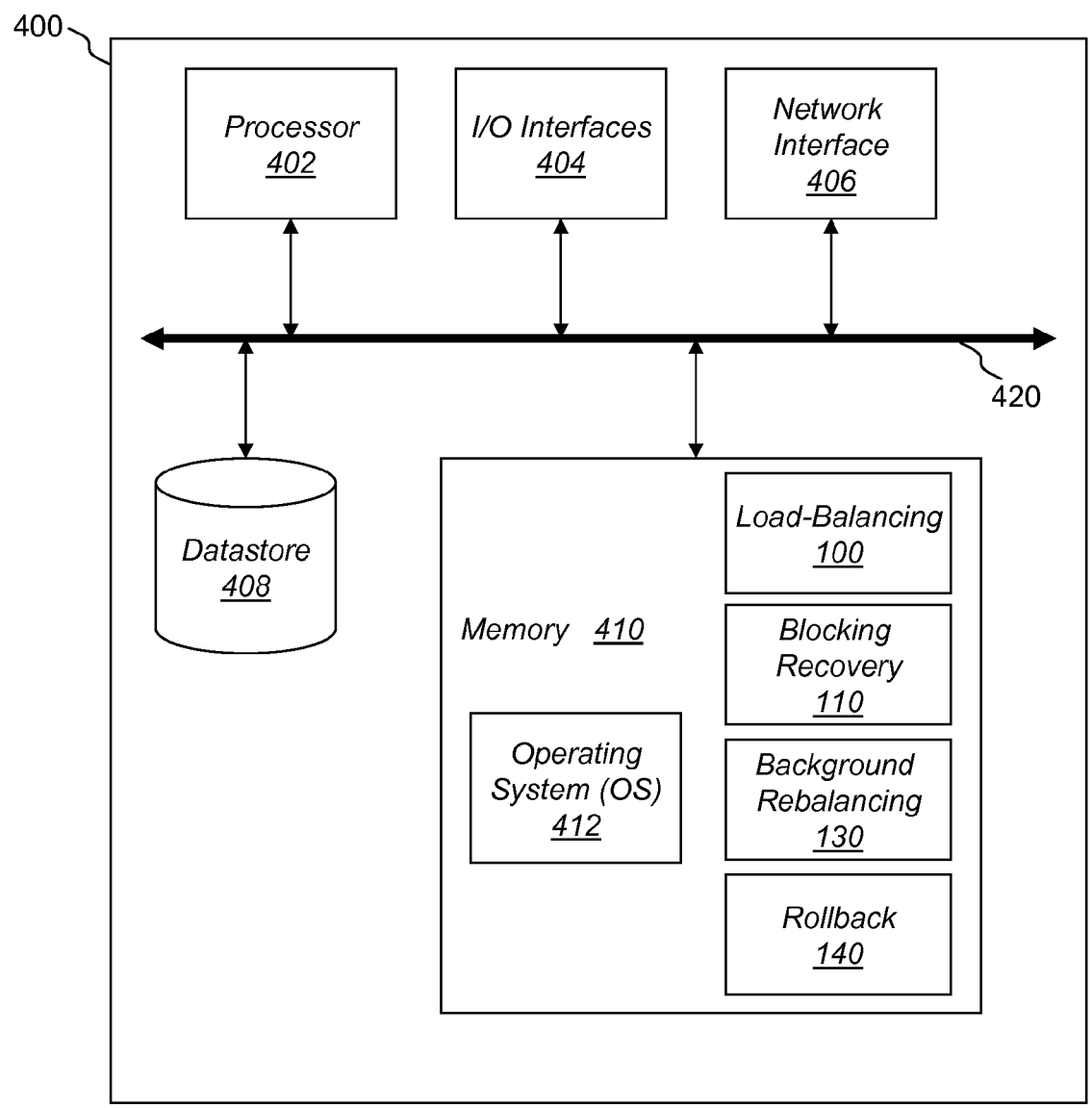
FIG. 20 is a block diagram of a controller according to an exemplary embodiment of the present invention.

Referring to FIG. 20, a block diagram illustrates a controller 400 configured to operate the load-balancing algorithm 100, the blocking recovery algorithm 110, the background rebalancing algorithm 130, and the rollback algorithm 140, according to an exemplary embodiment of the present invention. The controller 400 can be a digital computer that, in terms of hardware architecture, generally includes a processor 402, input/output (I/O) interfaces 404, network interfaces 406, memory 410, and a data store 408. In an exemplary embodiment, the controller 400 is either located within a switch network element or in communication through the I/O interfaces 404 or the network interfaces 406 with the switch network element.

The components (402, 404, 406, 408, and 410) are communicatively coupled via a local interface 420. The local interface 420 can be, for example but not limited to, one or more buses or other wired or wireless connections, as is known in the art. The local interface 420 can have additional elements, which are omitted for simplicity, such as controllers, buffers (caches), drivers, repeaters, and receivers, among many others, to enable communications. Further, the local interface 420 can include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the controller 400, a semiconductor-based microprocessor (in the form of a microchip or chip set), or generally any device for executing software instructions. When the controller 400 is in operation, the processor 402 is configured to execute software stored within the memory 410, to communicate data to and from the memory 410, and to generally control operations of the controller 400 pursuant to the software instructions.

The I/O interfaces 404 can be used to receive user input from and/or for providing system output to one or more devices or components. User input can be provided via, for example, a keyboard and/or a mouse. System output can be provided via a display device and a printer (not shown). I/O interfaces 404 can include, for example, a serial port, a parallel port, a small computer system interface (SCSI), an infrared (IR) interface, a radio frequency (RF) interface, a universal serial bus (USB) interface, and/or a backplane interface.

The network interfaces 406 can be used to enable the controller 400 to communicate on a network. For example, the controller 400 can utilize the network interfaces 406 to communicate to a management system (EMS, NMS, etc.) or to allow a user to remotely access the controller 400. Alternatively, the network interfaces 406 can communicate to the switch components over a backplane. The network interfaces 406 can include, for example, an Ethernet card (e.g., 10BaseT, Fast Ethernet, Gigabit Ethernet) or a wireless local area network (WLAN) card (e.g., 802.11a/b/g). The network interfaces 406 can include address, control, and/or data connections to enable appropriate communications on the network.

A data store 408 can be used to store data, such as information received from ingress, egress, and center stage switches. The data store 408 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 can incorporate electronic, magnetic, optical, and/or other types of storage media. In one example, the data store 408 can be located internal to the controller 400 such as, for example, an internal hard drive connected to the local interface 420 in the controller 400. Additionally in another embodiment, the data store can be located external to the controller 400 such as, for example, an external hard drive connected to the I/O interfaces 404 (e.g., SCSI or USB connection). Finally in a third embodiment, the data store may be connected to the controller 400 through a network, such as, for example, a network attached file server.

The memory 410 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 410 may incorporate electronic, magnetic, optical, and/or other types of storage media. Note that the memory 410 can have a distributed architecture, where various components are situated remotely from one another, but can be accessed by the processor 402.

The software in memory 410 can include one or more software programs, each of which includes an ordered listing of executable instructions for implementing logical functions. The software in the memory system 410 includes the algorithms 100, 110, 130, and 140 and a suitable operating system (O/S) 412. The operating system 412 essentially controls the execution of other computer programs, such as the control loop 414 engine, and provides scheduling, input-output control, file and data management, memory management, and communication control and related services. The operating system 412 can be any of Texas Instrument's Basic Input-Output System (BIOS) (available from Texas Instruments of Dallas, Tex.), Windows NT, Windows 2000, Windows XP, Windows Vista (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or any other real time operating system.

In an exemplary embodiment of the present invention, the algorithms 100, 110, 130, and 140 are configured to be performed by the controller 400. For example, the controller 400 can be a local node controller attached to a multi-stage switch employing the present invention. The data store 408 can be utilized to store rollback data associated with the algorithms. Alternatively, the controller 400 can be remote connecting to multiple multi-stage switches through the network interfaces 406. For example, the controller 400 can be provisioned to operate a control plane which simultaneously manages multiple switches including operating the algorithms described herein.

The system and methods of the present invention described herein are also contemplated with regards to switch fabrics with multiple center stages (i.e., two or more center stages). The algorithms 100, 110, 130, and 140 can be done on each of two or more stages of center switches. For example, a four-stage switch fabric would include ingress switches, two stages of center switches, and egress switches. Each of the algorithms 100, 110, 130, and 140 would operate on the two stages of center switches independently to determine imbalances, blockages, etc. for selecting which on the center stages each McSlice would utilize.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for programming a multi-connection slice through a multi-stage switch fabric comprising a plurality of ingress switches interconnected to a plurality of center stage switches interconnected to a plurality of egress switches, comprising:

receiving a multi-connection slice request, wherein the multi-connection slice comprises the flow in a single direction across the multi-stage switch fabric from one of the plurality of ingress switches to one of the plurality of egress switches, and wherein the request comprises the number of channels for a link defined as a number 1 to N, N being a maximum number of channels for the link;

computing an imbalance for all links from the one of the plurality of ingress switches to each of the plurality of center stage switches and from the one of the plurality of egress switches to each of the plurality of center stage switches, the imbalance comprising an actual number of free channels on a link versus an expected number of free channels on the link which comprises an average number of free channels across all the links;

selecting a center stage switch of the plurality of center stage switches responsive to the lowest imbalance from the computing step, wherein the selecting is performed on the multi-connection slice request to make a best possible local decision for the multi-connection slice request at a time without considering other multi-connection slice requests needing center stage switch assignments; and performing background rebalancing responsive to the multi-stage switch fabric being idle for a time period, wherein background rebalancing is configured as a proactive measure to reduce imbalances in the plurality of center stage switches, and wherein the background rebalancing utilizes an imbalance threshold to select links and then randomly selects multi-connection slices for each of the selected links for rearrangement.

2. The method for programming a multi-connection slice through a multi-stage switch fabric of claim 1, further comprising:

performing blocking recovery if the selecting step fails due to blocking on one or more links, wherein blocking recovery rearranges multi-connection slices on the one or more links so that the multi-connection slice request can be added.

3. The method for programming a multi-connection slice through a multi-stage switch fabric of claim 2, wherein blocking recovery comprises:

randomly selecting one or more channels on the one or more links;

finding multi-connection slices for each of the randomly selected one or more channels; and reallocating each of the multi-connection slices for each of the randomly selected one or more channels to a new center stage switch of the plurality of center stage switches.

4. The method for programming a multi-connection slice through a multi-stage switch fabric of claim 3, wherein the blocking recovery is repeated if one or more links are still blocked.

5. The method for programming a multi-connection slice through a multi-stage switch fabric of claim 3, further comprising:

storing rollback data for each of multi-connection slices for each of the randomly selected one or more channels;

performing a chain pull operation, wherein the chain pull operation comprises a hitless update achieved by writing a new configuration to a standby bank of the plurality of ingress, egress, and center stage switches and then doing a global active/standby bank swap between an active and the standby bank of the plurality of ingress, egress, and center stage switches; and implementing a rollback utilizing the rollback data responsive to a failure of the chain pull operation.

6. The method for programming a multi-connection slice through a multi-stage switch fabric of claim 5, wherein the rollback comprises:
  removing all of the multi-connection slices reallocated to the new center stage switch in the reallocating each of the multi-connection slices step;
  reallocating channels to a prior multi-connection slice; and
  reassigning time slots to the channels.

7. The method for programming a multi-connection slice through a multi-stage switch fabric of claim 1, wherein background rebalancing comprises:
  setting the imbalance threshold;
  finding all links between the plurality of ingress switches, the plurality of center stage switches, and the plurality of egress switches above the set imbalance threshold;
  randomly selecting multi-connection slices for each of the found links; and
  utilizing a chain pull operation to rearrange each of the randomly selected multi-connection slices to a new center stage switch of the plurality of center stage switches.

8. The method for programming a multi-connection slice through a multi-stage switch fabric of claim 7, wherein the background rebalancing is repeated with one of a new imbalance threshold and the same imbalance threshold.

9. The method for programming a multi-connection slice through a multi-stage switch fabric of claim 7, further comprising:
  storing rollback data for each of multi-connection slices; and
  implementing a rollback utilizing the rollback data responsive to a failure of the chain pull operation.

10. A multi-stage switch fabric with a load-balancing algorithm for provisioning multi-connection slices through center stages of the switch fabric, comprising:
  a plurality of ingress switches interconnected to a plurality of center stage switches interconnected to a plurality of egress switches;
  a controller in communication with the plurality of ingress switches, the plurality of center stage switches, and the plurality of egress switches, wherein the controller is configured to:
  receive a multi-connection slice request comprising a number of channels 1 to N with N being a maximum number of channels supported, wherein the multi-connection slice comprises the flow of the channels in a single direction across the multi-stage switch fabric from one of the plurality of ingress switches to one of the plurality of egress switches;
  select one of the center stage switch of the plurality of center stage switches responsive to computed imbalances of all links the one of the plurality of ingress switches to each of the plurality of center stage switches and from the one of the plurality of egress switches to each of the plurality of center stage switches, wherein the controller is configured to select the one of the center stage switch to make a best possible local decision for the multi-connection slice request at a time without considering other multi-connection slice requests needing center stage switch assignments, and wherein the imbalance is computed from an actual number of free channels on a link versus an expected number of free channels on the link which comprises an average number of free channels across all links; and
  perform background rebalancing responsive to the multi-stage switch fabric being idle for a time period, wherein background rebalancing is configured as a proactive measure to reduce imbalances in the plurality of center stage switches, and wherein the background rebalancing utilizes an imbalance threshold to select links and then randomly selects multi-connection slices for each of the selected links for rearrangement.

11. The multi-stage switch fabric with a load-balancing algorithm of claim 10, wherein the controller is further configured to perform blocking recovery responsive to blocking on one or more links, wherein blocking recovery rearranges multi-connection slices on the one or more links so that the multi-connection slice request can be added.

12. The multi-stage switch fabric with a load-balancing algorithm of claim 11, further comprising a data store configured to store rollback data utilized to roll back the multi-connection slices on the one or more links if the blocking recovery fails.

13. The multi-stage switch fabric with a load-balancing algorithm of claim 10, further comprising a data store configured to store rollback data utilized to roll back the rebalancing if the background rebalancing fails.

14. A three-stage optical switch with a load-balancing algorithm for provisioning connections through center stages of the switch fabric, comprising:
  a plurality of line modules each line module comprising a plurality of ingress switches and a plurality of egress switches;
  a plurality of switch modules each switch module comprising a plurality of center stage switches, the plurality of ingress, egress, and center stage switches forming a Clos switch;
  a backplane connected to the plurality of line modules and the plurality of switch modules, wherein the plurality of ingress switches, the plurality of egress switches, and the plurality of center stage switches are interconnected through the backplane;
  means for selecting a center stage switch of the plurality of center stage switches responsive to one of a new and modified connection comprising one or more channels on a given link from one of the plurality of ingress switches to one of the plurality of egress switches and responsive to an imbalance in the plurality of center stage switches, wherein the means for selecting is performed on the one of a new and modified connection to make a best possible local decision for the one of a new and modified connection at a time without considering other connections needing center stage switch assignments, wherein the one or more channels comprises a number 1 to N, N being a maximum number of channels for a link, and wherein the imbalance comprises an actual number of free channels on a link versus an expected number of free channels on the link which comprises an average number of free channels across all links; and
  means for background rebalancing of the plurality of center stage switches, wherein background rebalancing is configured as a proactive measure to reduce imbalances in the plurality of center stage switches, and wherein the background rebalancing utilizes an imbalance threshold to select links and then randomly selects multi-connection slices for each of the selected links for rearrangement.

15. The three-stage optical switch with a load-balancing algorithm of claim 14, further comprising means for blocking recovery, wherein blocking recovery rearranges connections between the of the plurality of ingress switches, the plurality of center stage switches, and the plurality of egress switches so that one of the new and modified connection can be added.

16. The three-stage optical switch with a load-balancing algorithm of claim 15, further comprising means for rollback responsive to a failure in blocking recovery.

17. The three-stage optical switch with a load-balancing algorithm of claim 14, further comprising means for rollback responsive to a failure in background rebalancing.

* * * * *